US010817506B2

(12) United States Patent
Shukla et al.

(10) Patent No.: US 10,817,506 B2
(45) Date of Patent: Oct. 27, 2020

(54) DATA SERVICE PROVISIONING, METERING, AND LOAD-BALANCING VIA SERVICE UNITS

(71) Applicant: Microsoft Technology Licensing, LLC, Redmond, WA (US)

(72) Inventors: Dharma Shukla, Bellevue, WA (US); Momin Mahmoud Al-Ghosien, Sammamish, WA (US); Rajeev Sudhakar Bhopi, Mercer Island, WA (US); Samer Boshra, Woodinville, WA (US); Madhan Gajendran, Bengaluru (IN); Artavazd Ginosian, Seattle, WA (US); Atul Katiyar, Sammamish, WA (US); Liang Li, Sammamish, WA (US); Karthik Raman, Sammamish, WA (US); Ankur Savailal Shah, Redmond, WA (US); Pankaj Sharma, Kirkland, WA (US); Hari Sudan Sundar, Redmond, WA (US); Krishnan Sundaram, Bellevue, WA (US); Shireesh Kumar Thota, Redmond, WA (US); Lalitha Manjapara Viswanathan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 141 days.

(21) Appl. No.: 15/991,062

(22) Filed: May 29, 2018

(65) Prior Publication Data

US 2019/0342379 A1 Nov. 7, 2019

Related U.S. Application Data

(60) Provisional application No. 62/668,226, filed on May 7, 2018.

(51) Int. Cl.
*G06F 16/23* (2019.01)
*G06F 16/27* (2019.01)
(Continued)

(52) U.S. Cl.
CPC ........ *G06F 16/2365* (2019.01); *G06F 9/5077* (2013.01); *G06F 11/2007* (2013.01);
(Continued)

(58) Field of Classification Search
CPC .................................................. G06F 16/2365
See application file for complete search history.

(56) References Cited

U.S. PATENT DOCUMENTS 5,446,880 A 8/1995 Balgeman et al.
5,581,753 A 12/1996 Terry et al.
(Continued)

FOREIGN PATENT DOCUMENTS

CN 102497410 A 6/2012
CN 104935672 A 9/2015
(Continued)

OTHER PUBLICATIONS

"Conflict Resolution", Retreived from https://web.archive.org/web/20120402192233/https:/docs.oracle.com/cd/E11882_01/server.112/e10706/repconflicts.htm, Apr. 2, 2012, 28 Pages.
(Continued)

*Primary Examiner* — Suraj M Joshi
(74) *Attorney, Agent, or Firm* — Alleman Hall Creasman & Tuttle LLP

(57) ABSTRACT

Workloads are often performed by a server set according to a service level agreement, and are often provisioned and load-balanced by dedicating selected computational resources (e.g., servers and bandwidth) for application to the workload. However, resource-based provisioning may not accurately reflect the computational resource expenditure of
(Continued)

the workload, leading to overprovisioning or underprovisioning of servers for the workload. Instead, the workload may be evaluated according to a service unit as a measurement of a volume of computational resources consumed by a workload unit, including performance dimensions specified in the service level agreement. The service level agreement may indicate a service unit rate for the workload. The workload may therefore be allocated to a subset of servers in portions according to a service unit rate, where the sum of the service unit rates for the portions allocated to the servers satisfies the service unit rate specified in the service level agreement.

20 Claims, 8 Drawing Sheets

(51) Int. Cl.
*G06F 11/20* (2006.01)
*G06F 16/22* (2019.01)
*G06F 16/2452* (2019.01)
*G06F 16/28* (2019.01)
*G06F 16/25* (2019.01)
*G06F 16/21* (2019.01)
*H04L 29/08* (2006.01)
*G06F 9/50* (2006.01)
*H04L 12/24* (2006.01)
*H04L 12/911* (2013.01)
*H04L 12/923* (2013.01)
*G06F 16/182* (2019.01)
*G06F 16/903* (2019.01)
*H04L 29/06* (2006.01)

(52) U.S. Cl.
CPC ...... *G06F 11/2023* (2013.01); *G06F 11/2056* (2013.01); *G06F 16/184* (2019.01); *G06F 16/211* (2019.01); *G06F 16/219* (2019.01); *G06F 16/2246* (2019.01); *G06F 16/2255* (2019.01); *G06F 16/2272* (2019.01); *G06F 16/2452* (2019.01); *G06F 16/252* (2019.01); *G06F 16/258* (2019.01); *G06F 16/27* (2019.01); *G06F 16/28* (2019.01); *G06F 16/903* (2019.01); *H04L 41/0803* (2013.01); *H04L 41/0896* (2013.01); *H04L 41/5009* (2013.01); *H04L 41/5019* (2013.01); *H04L 41/5022* (2013.01); *H04L 41/5032* (2013.01); *H04L 47/72* (2013.01); *H04L 47/762* (2013.01); *H04L 67/1008* (2013.01); *H04L 67/1012* (2013.01); *H04L 67/1034* (2013.01); *H04L 69/24* (2013.01); *G06F 2201/80* (2013.01); *H04L 67/1029* (2013.01)

(56) References Cited

U.S. PATENT DOCUMENTS

| | | | |
|---|---|---|---|
| 5,581,754 A | 12/1996 | Terry et al. |
| 5,787,262 A | 7/1998 | Shakib et al. |
| 5,923,850 A | 7/1999 | Barroux |
| 6,523,032 B1 | 2/2003 | Sunkara et al. |
| 6,535,874 B2 | 3/2003 | Purcell |
| 6,925,457 B2 | 8/2005 | Britton et al. |
| 7,117,221 B2 | 10/2006 | Hahn et al. |
| 7,269,648 B1 | 9/2007 | Krishnan et al. |
| 7,509,354 B2 | 3/2009 | McGarvey |
| 7,606,838 B2 | 10/2009 | Tobies |
| 7,689,599 B1 | 3/2010 | Shah et al. |
| 7,751,331 B1 | 7/2010 | Blair et al. |
| 7,774,473 B2 | 8/2010 | Elving et al. |
| 7,877,644 B2 | 1/2011 | Stenzel |
| 8,311,981 B2 | 11/2012 | Braginsky et al. |
| 8,326,807 B2 | 12/2012 | Aiyer et al. |
| 8,386,421 B2 | 2/2013 | Reid et al. |
| 8,392,482 B1 | 3/2013 | McAlister et al. |
| 8,572,022 B2 | 10/2013 | Hagan et al. |
| 8,595,267 B2 | 11/2013 | Sivasubramanian et al. |
| 8,719,313 B2 | 5/2014 | Swett et al. |
| 8,745,127 B2 | 6/2014 | Gopal et al. |
| 8,824,286 B2 | 9/2014 | Lee et al. |
| 8,862,588 B1 | 10/2014 | Gay et al. |
| 8,880,508 B2 | 11/2014 | Jeong et al. |
| 8,943,180 B1 | 1/2015 | Petit-Huguenin |
| 8,972,491 B2 | 3/2015 | Abu-Libdeh et al. |
| 9,026,493 B1 | 5/2015 | Weng |
| 9,195,725 B2 | 11/2015 | Brown et al. |
| 9,219,686 B2 | 12/2015 | Hilt et al. |
| 9,225,770 B2 | 12/2015 | Wang et al. |
| 9,230,040 B2 | 1/2016 | Shukla et al. |
| 9,244,926 B2 | 1/2016 | Kakivaya et al. |
| 9,292,566 B2 | 3/2016 | Golab et al. |
| 9,356,793 B1 | 5/2016 | Drobychev et al. |
| 9,405,474 B2 | 8/2016 | Shukla et al. |
| 9,411,873 B2 | 8/2016 | Rath et al. |
| 9,460,129 B2 | 10/2016 | Mann |
| 9,462,427 B2 | 10/2016 | Patel et al. |
| 9,471,711 B2 | 10/2016 | Abadi et al. |
| 9,569,513 B1 | 2/2017 | Vig et al. |
| 9,619,261 B2 | 4/2017 | Gaurav et al. |
| 9,632,828 B1 | 4/2017 | Mehta et al. |
| 9,645,835 B2 | 5/2017 | Phillips et al. |
| 9,781,124 B2 | 10/2017 | Goldberg et al. |
| 9,888,067 B1 | 2/2018 | Yemini et al. |
| 10,552,443 B1 | 2/2020 | Wu et al. |
| 2002/0035642 A1 | 3/2002 | Clarke et al. |
| 2002/0161757 A1 | 10/2002 | Mock et al. |
| 2003/0037283 A1 | 2/2003 | Srinivasan et al. |
| 2003/0046396 A1* | 3/2003 | Richter .................. G06F 9/505 709/226 |
| 2003/0135643 A1 | 6/2003 | Chiu et al. |
| 2003/0220966 A1 | 11/2003 | Hepper et al. |
| 2004/0230571 A1 | 11/2004 | Robertson |
| 2004/0236801 A1 | 11/2004 | Borden et al. |
| 2005/0138170 A1* | 6/2005 | Cherkasova .......... H04L 41/145 709/225 |
| 2005/0160133 A1 | 7/2005 | Greenlee et al. |
| 2006/0106879 A1 | 5/2006 | Zondervan et al. |
| 2006/0155945 A1 | 7/2006 | Mcgarvey |
| 2006/0224773 A1* | 10/2006 | Degenaro ............. G06F 9/5083 709/240 |
| 2006/0282836 A1 | 12/2006 | Barker |
| 2007/0073675 A1 | 3/2007 | Kaar et al. |
| 2008/0147627 A1 | 6/2008 | Natkovich et al. |
| 2008/0301025 A1 | 12/2008 | Boss et al. |
| 2009/0248737 A1 | 10/2009 | Shukla et al. |
| 2010/0082630 A1 | 4/2010 | Zagelow et al. |
| 2010/0094838 A1 | 4/2010 | Kozak |
| 2011/0149743 A1 | 6/2011 | Agarwal et al. |
| 2011/0258483 A1 | 10/2011 | Elson et al. |
| 2012/0136839 A1 | 5/2012 | Eberlein et al. |
| 2012/0185444 A1 | 7/2012 | Sparkes et al. |
| 2013/0064110 A1 | 3/2013 | Polinati et al. |
| 2013/0159253 A1 | 6/2013 | Dewall et al. |
| 2013/0232153 A1 | 9/2013 | Dhuse et al. |
| 2013/0254164 A1 | 9/2013 | Tsofi et al. |
| 2014/0052761 A1 | 2/2014 | Teitelbaum |
| 2014/0101298 A1 | 4/2014 | Shukla et al. |
| 2014/0195514 A1 | 7/2014 | Stein |
| 2014/0279844 A1 | 9/2014 | Shukla et al. |
| 2014/0297776 A1 | 10/2014 | Volvovski et al. |
| 2014/0304371 A1 | 10/2014 | Mraz et al. |
| 2014/0359348 A1 | 12/2014 | Volvovski et al. |
| 2015/0026189 A1 | 1/2015 | Li et al. |
| 2015/0154074 A1 | 6/2015 | Resch et al. |
| 2015/0195162 A1 | 7/2015 | Gandham et al. |
| 2015/0269239 A1 | 9/2015 | Swift et al. |
| 2015/0304983 A1 | 10/2015 | Krening et al. |
| 2016/0034433 A1 | 2/2016 | Yamat et al. |
| 2016/0321588 A1 | 11/2016 | Das et al. |

(56) References Cited

U.S. PATENT DOCUMENTS

| | | | |
|---|---|---|---|
| 2016/0342645 A1 | 11/2016 | Tempero et al. | |
| 2017/0068713 A1 | 3/2017 | Joshi et al. | |
| 2017/0123948 A1 | 5/2017 | Dhuse et al. | |
| 2017/0199770 A1 | 7/2017 | Peteva et al. | |
| 2017/0201597 A1 | 7/2017 | Narasimhan et al. | |
| 2017/0220651 A1 | 8/2017 | Mathew et al. | |
| 2017/0286180 A1 | 10/2017 | He et al. | |
| 2017/0293540 A1 | 10/2017 | Mehta et al. | |
| 2017/0308562 A1 | 10/2017 | Sreekantaiah et al. | |
| 2017/0318085 A1 | 11/2017 | Shukla et al. | |
| 2017/0364345 A1 | 12/2017 | Fontoura et al. | |
| 2018/0150331 A1 | 5/2018 | Chen et al. | |
| 2018/0316752 A1* | 11/2018 | Hodges | H04L 67/1023 |
| 2019/0163391 A1 | 5/2019 | Annamalai et al. | |
| 2019/0166019 A1* | 5/2019 | Jagadeesh | H04L 5/0032 |
| 2019/0171737 A1 | 6/2019 | Duan et al. | |
| 2019/0196878 A1 | 6/2019 | Li | |
| 2019/0340166 A1 | 11/2019 | Raman et al. | |
| 2019/0340167 A1 | 11/2019 | Raman et al. | |
| 2019/0340168 A1 | 11/2019 | Raman et al. | |
| 2019/0340265 A1 | 11/2019 | Raman et al. | |
| 2019/0340273 A1 | 11/2019 | Raman et al. | |
| 2019/0340291 A1 | 11/2019 | Raman et al. | |
| 2019/0342188 A1 | 11/2019 | Raman et al. | |
| 2019/0342380 A1 | 11/2019 | Thota et al. | |

FOREIGN PATENT DOCUMENTS

| | | |
|---|---|---|
| WO | 9735270 A1 | 9/1997 |
| WO | 2008100795 A1 | 8/2008 |
| WO | 2010048595 A2 | 4/2010 |

OTHER PUBLICATIONS

"Conflict Resolution", Retrieved from https://docs.oracle.com/cd/F49540_01/DOC/server.815/a67791/ch6.htm, Retrieved Date: Aug. 31, 2018, 43 Pages.

"Conflict Resolution Concepts and Architecture", Retrieved from https://docs.oracle.com/cd/B10500_01/server.920/a96567/repconflicts.htm, Nov. 15, 2011, 35 Pages.

"Couchbase Server: Schemaless Data Modeling", Retrieved from https://developer.couchbase.com/documentation/server/3.x/developer/dev-guide-3.0/schemaless.html, Retrieved Date: Nov. 20, 2017, 5 Pages.

"Lotus Notes/Domino Replication Conflict Solver", Retrieved from https://web.archive.org/web/20100306134644/http://www.ytria.com/WebSite.nsf/WebPageRequest/Solutions_scanEZ_ConflictSolveren, Dec. 15, 2005, 2 Pages.

"Master Replication Concepts and Architecture", Retrieved from https://docs.oracle.com/cd/B10501_01/server.920/a96567/repmaster.htm, Feb. 17, 2012, 40 Pages.

"Master-master vs Master-slave Database Architecture?", Retrieved from https://stackoverflow.com/questions/3736969/master-master-vs-master-slave-database-architecture, Retrieved Date: Jul. 2, 2018, 8 Pages.

"Master-to-Slave Replication", Retrieved from https://www.ibm.com/support/knowledgecenter/en/POWER8/p8ha1/example2mastertoslavereplication.htm, Retrieved Date: Jul. 3, 2018, 4 Pages.

"Replica Set Elections", Retrieved from https://docs.mongodb.com/manual/core/replica-set-elections/, Retrieved Date: Jul. 2, 2018, 6 Pages.

Afriansyah, et al., "Model of Load Balancing Using Reliable Algorithm With Multi-Agent System", In Journal of IOP Conference Series: Materials Science and Engineering, vol. 190, Issue 1, Apr. 2017, 9 Pages.

Ardagna, et al., "SLA Based Resource Allocation Policies in Autonomic Environments", In Journal of Parallel and Distributed Computing, vol. 67, Issue 3, Mar. 1, 2007, pp. 259-270.

Fernandez, et al., "Autoscaling Web Applications in Heterogeneous Cloud Infrastructures", In Proceedings of IEEE International Conference on Cloud Engineering, Mar. 11, 2014, 11 Pages.

Gunda, et al., "Multi-master at global scale with Azure Cosmos DB", Retrieved from https://docs.microsoft.com/en-us/azure/cosmos-db/multi-region-writers, May 7, 2018, 9 Pages.

Liu, et al., "Consistency as a Service: Auditing Cloud Consistency", In Journal of IEEE Transactions on Network and Service Management, vol. 11, Issue 1, Mar. 2014, pp. 25-35.

Masha, et al., "Implement a Custom Conflict Resolver for a Merge Article", Retrieved from https://docs.microsoft.com/en-us/sql/relational-databases/replication/implement-a-custom-conflict-resolver-for-a-merge-article?view=sql-server-2017, Mar. 14, 2017, 6 Pages.

Patra, Chandan, "How to Use Consistency Models for Amazon Web Services", Retrieved from https://cloudacademy.com/blog/consistency-models-of-amazon-cloud-services/, Jun. 3, 2016, 9 Pages.

Shukla, et al., "Schema-Agnostic Indexing with Azure DocumentDB", In Proceedings of 41st International Conference on Very Large Data Bases, vol. 8, Issue 12, Aug. 1, 2015, pp. 1668-1679.

Singh, et al., "Server-Storage Virtualization: Integration and Load Balancing in Data Centers", In Proceedings of ACM/IEEE Conference on Supercomputing, Nov. 15, 2008, 12 Pages.

Thomsen, Jakob Holdgaard, "UBER Engineering: The Architecture of Schemaless, Uber Engineering's Trip Datastore Using MySQL", Retrieved from https://eng.uber.com/schemaless-part-two/, Jan. 15, 2016, 8 Pages.

"International Search Report and Written Opinion Issued in PCT Application No. PCT/US2019/031207", dated Jul. 19, 2019, 13 Pages.

"International Search Report and Written Opinion Issued in PCT Application No. PCT/US2019/031204", dated Jul. 19, 2019, 14 Pages.

"International Search Report and Written Opinion Issued in PCT Application No. PCT/US2019/031208", dated Jul. 24, 2019, 15 Pages.

"Non Final Office Action Issued in U.S. Appl. No. 15/991,953", dated Aug. 22, 2019, 21 Pages.

"Non Final Office Action Issued in U.S. Appl. No. 15/991,632", dated Jan. 24, 2020, 23 Pages.

"Final Office Action Issued in U.S. Appl. No. 15/991,953", dated Feb. 14, 2020, 24 Pages.

Likness, Jeremy, "Getting Behind the 9-Ball: Cosmos DB Consistency Levels Explained", Retrieved From: https://blog.jeremylikness.com/blog/2018-03-23_getting-behind-the-9ball-cosmosdb-consistency-levels/, Mar. 23, 2018, 8 Pages.

Montazerolghaem, et al., "Overload Control in SIP Networks: A Heuristic Approach based on Mathematical Optimization", In Proceedings of Global Communications Conference (GLOBECOM), Dec. 6, 2015, 6 Pages.

"Non Final Office Action Issued in U.S. Appl. No. 15/991,223", dated Apr. 9, 2020, 15 Pages.

"Final Office Action Issued in U.S. Appl. No. 15/991,632", dated May 19, 2020, 22 Pages.

Non-Final Office Action Issued in U.S. Appl. No. 15/991,786, dated May 8, 2020, 36 Pages.

"Non-Final Office Action Issued in U.S. Appl. No. 15/991,880", dated Jun. 10, 2020, 37 Pages.

Buckler, Craig, "Flow to Convert XML to a JSON-Like JavaScript Object", Retrieved From: http://www.sitepoint.com/how-to-convert-xml-to-a-javascript-object, Oct. 20, 2011, 9 Pages.

Chan, et al., "Taming XPath Queries by Minimizing Wildcard Steps", In Proceedings of the 30th VLDB Conference, Aug. 31, 2004, pp. 159-167.

He, et al., "Query Language and Access Methods for Graph Databases", In Book Managing and Mining Graph Data, 2010, pp. 125-160.

Kossmann, Donald, "The State of the Art in Distributed Query Processing", In ACM Computing Surveys, vol. 32, No. 4, Dec. 2000, pp. 422-469.

Kraska, et al., "Consistency Rationing in the Cloud: Pay only when it Matters", In Proceedings of the Very Large Data Bases Endowment, vol. 2, Issue 1, Aug. 24, 2009, 12 Pages.

(56) References Cited

OTHER PUBLICATIONS

Lim, et al., "Automated Control for Elastic Storage", In Proceedings of the 7th International Conference on Autonomic Computing, Jun. 7, 2010, pp. 1-10.

Moon, et al., "Introducing SSDs to the Hadoop MapReduce Framework", In Proceedings of 7th International Conference on Cloud Computing, Jun. 27, 2014, pp. 272-279.

Xue, et al, "COMET: Client-Oriented File Systems", In Proceedings of 27th International Symposium on Computer Architecture and High Performance Computing (SBAC-PAD) Oct. 17, 2015, pp. 154-161.

"Non Final Office Action Issued in U.S. Appl. No. 15/991,953", dated Jul. 16, 2020, 24 Pages.

\* cited by examiner

DATA SERVICE PROVISIONING, METERING, AND LOAD-BALANCING VIA SERVICE UNITS

CROSS-REFERENCE TO RELATED APPLICATIONS

This application is a continuation of, and claims priority under 35 U.S.C. §§ 119-120 to, U.S. Patent Application No. 62/668,226, entitled "DISTRIBUTED DATABASES," filed on May 7, 2018, the entirety of which is hereby incorporated by reference as if fully rewritten herein.

BACKGROUND

Within the field of computing, many scenarios involve a data service that processes workloads by a set of servers on behalf of a set of clients. Such services include, e.g., databases, websites and web services, media presentation, content rendering, simulation, and artificial intelligence applications such as pattern detection and natural-language processing.

In such scenarios, the service may offer to allocate a portion of a server or a set of servers that are estimated to be sufficient for the workload. In some cases, the service may assist the client in determining a sufficient allocation of resources; in other cases, the service may simply offer computational resources, such as processors, storage, and bandwidth, and allow the client to reserve and provision a selected amount of resources that the client anticipates to be sufficient for the workload. The data service may establish a service level agreement with the client that specifies performance dimensions of the service, such as a commitment of computing resources (optionally specifying the specifications of the committed resources, such as a processor type and speed) and a projected availability, such as a sigma level indicating a tolerable amount of unavailability in a period of time. Other dimensions of the service may be less formally specified as part of the service level agreement, such as a general commitment to reducing the risk of data loss and general comments about the projected consistency of values that are read from different servers that share a database used by the workload. Still other dimensions may be non-negotiable and/or omitted from the service level agreement, such as latency and the capability and speed of the service to scale to handle greater throughput on demand.

Nevertheless, the establishment of the workload enables the client and data service to document the mutual understanding of the performance dimensions of the service upon which the workload depends. The client may deliver the workload to the server, which may partition it over the set of servers. In some scenarios, the workload may execute on behalf of the client on a dedicated server or over a set of dedicated servers. In other circumstances, such as multitenancy, the workload may execute on a server alongside the workloads of one or more other clients. Load-balancing considerations may prompt the service to relocate one or more workloads between servers, which may involve an estimation of whether the new server is capable of serving the workload in a comparable manner as the previous server. The client may also wish to adjust the performance of the workload by the server set, such as increasing or decreasing processing capacity, storage capacity, and/or network bandwidth as a result of changes in the constraints of the workload and the demand therefor.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The allocation of workloads over servers using a resource-focused service level agreement may exhibit a number of disadvantages. As a first example, the matching of workloads to servers depends on two estimates: an estimate of the computational load imposed by the workload and an estimate of the computational capacity that a server is capable of providing. An error in either or both estimations may lead to underprovisioning, where the computational resources consumed by the workload exceed expected consumption and potentially exhaust the computational resources of a server, which may result in an abrupt and unexpected failure of the workload. In multitenancy scenarios wherein the server is provisioned to perform workloads on behalf of numerous clients, underestimates may add up to exacerbate the risk of an unanticipated failure of the server despite an anticipated surplus of spare computational capacity. Moreover, the underestimate of the computational load imposed by a first workload may lead to a failure of a server that also hosts a second workload for which the computational load was correctly estimated or even overestimated, potentially damaging other clients who utilize the data service.

Alternatively, an error in either or both estimations may lead to overprovisioning, where the computational resources that are reserved for use by a workload are not productively utilized. Moreover, the server may be unable to reallocate the extra capacity without violating the service level agreement and/or risking a shortage of computational capacity if the volume of the workload surges at a later time. Accordingly, the server set may have to cause the server to idle during the unused computational capacity. The client may also not realize or be alerted that the extra computational capacity was not used, and therefore may not act to reduce or eliminate the idle periods of the server.

As yet another potential disadvantage, the resource-oriented focus of some service level agreements may reduce the portability of a workload. For example, the service level agreement provides that an initial server with particular computational resources is to be provided for the workload, but it may later be desirable to relocate the workload to an alternative server (e.g., for load-balancing or scalability). However, the computational resources of the alternative server may differ from those of the initial server, such that it may be difficult to predict whether the alternative server will be overprovisioned and/or underprovisioned for the workload. The client or the data service may have to resort to trial-and-error, and may have to revert the transfer in case the alternative server is inadequate. In this manner, the provisioning of the data service may at times become prospective, unreliable, and overly dependent upon personal knowledge and manual maintenance to adapt to changing circumstances.

Presented herein are techniques for allocating workloads over servers in a server set. In accordance with such techniques, a unit of computational resources is established that is termed a service unit, which describes a particular volume of computational resources that may be applied to a workload. The service unit may serve as a type of metric of computational resources, or as an exchange rate for normalizing and comparing the computational capacities of servers and the computational resource consumption of a task or workload.

A computational capacity of a server may be evaluated as a measure of service units over a unit of time. For example, a server may process a test workload that has been structured as a series of workload units that are processed by applying a known or established quantity of service units. The computational capacity of the server may then be reported as a service unit rate that the server is capable of providing over the unit of time (e.g., an average of 400 service units per minute, and/or an average 50 service units per second).

The computational resource consumption of a workload may also be identified as a service unit cost per workload unit. For example, a service that applies a particular query to a large database may be evaluated as having a service unit costs of three service units per execution. The service unit cost may be identified, e.g., in view of the sequence of operations involved in a workload unit of the workload and/or the performance dimensions under which the workload is to be performed. The client may be informed of the service unit cost as part of the service level agreement, and may select a service unit rate of service units that are to be applied to the workload (e.g., a typical 100 service units per minute). Additionally, various performance dimensions of the service may be evaluated as increasing or decreasing the service unit cost for a workload unit of the workload; e.g., higher consistency levels or availability guarantees may be included as options in the service level agreement with an indication of whether such options increase or decrease the service unit costs per workload unit.

The data service may utilize these metrics based on service units to provision, measure, and load-balance the server set. For example, a server that has a service unit rate spare capacity of 200 service units per minute may be selected to process a workload for which the service level agreement specifies a limit of 180 service units per minute. Alternatively, the workload may be distributed over two servers that each provides 100 service units per minute. Load-balancing may prompt the relocation and/or partitioning of a workload with a different server of the server set, and may be accomplished by choosing an alternative server that reports a sufficient service unit rate spare capacity. In this manner, the provisioning and load-balancing of the workloads over the servers may be performed in a more objective manner, using service units as a common measure or exchange rate of both computational capacity of servers and computational resource costs of workloads, in accordance with the techniques presented herein.

A first embodiment of the presented techniques involves a server that performs a workload as part of a server set. The server comprising: a processor and a memory storing instructions that, when executed by the processor, cause the server to utilize the techniques presented herein. For example, executing the instructions causes the server to identify a service unit rate capacity of the server as a rate of service units that the server is capable of providing, wherein the service unit is a volume of computational resources of the server. Executing the instructions also causes the server to receive a workload that is associated with a service unit cost that is consumed by a workload unit of the workload. Executing the instructions also causes the server to receive an allocation request to allocate computational resources of the server to perform a portion of the workload at a service unit rate. Executing the instructions also causes the server to, within the service unit rate capacity of the server, allocate a subset of computational resources of the server that are capable of performing the workload at the service unit rate.

A second embodiment of the presented techniques involves a method of configuring a server to perform a workload as part of a server set. The method involves executing instructions on the processor that cause the server to identify a service unit rate capacity of the server as a rate of service units that the server is capable of providing, wherein the service unit is a volume of computational resources of the server. Execution of the instructions also causes the server to receive a workload that is associated with a service unit cost that is consumed by a workload unit of the workload. Execution of the instructions also causes the server to receive an allocation request to allocate computational resources of the server to perform a portion of the workload at a service unit rate. Execution of the instructions also causes the server to, within the service unit rate capacity of the server, allocate a subset of computational resources of the server that are capable of performing the portion of the workload at the service unit rate.

A third embodiment of the presented techniques involves a method of configuring a server set to perform a workload. The method involves identifying a service unit cost that is consumed by a workload unit of the workload, wherein the service unit cost is based on a service unit as a volume of computational resources. The method also involves establishing a service level agreement specifying the service unit cost of the workload unit of the workload and a service unit rate to be provided for the workload by the server set. The method also involves allocating the server set to perform the workload by identifying a server subset of servers to perform the workload and assigning, to respective servers of the server subset, an allocated service unit rate for a portion of the workload, wherein the allocated service unit rates of the respective servers at least sum to the service unit rate specified in the service level agreement.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
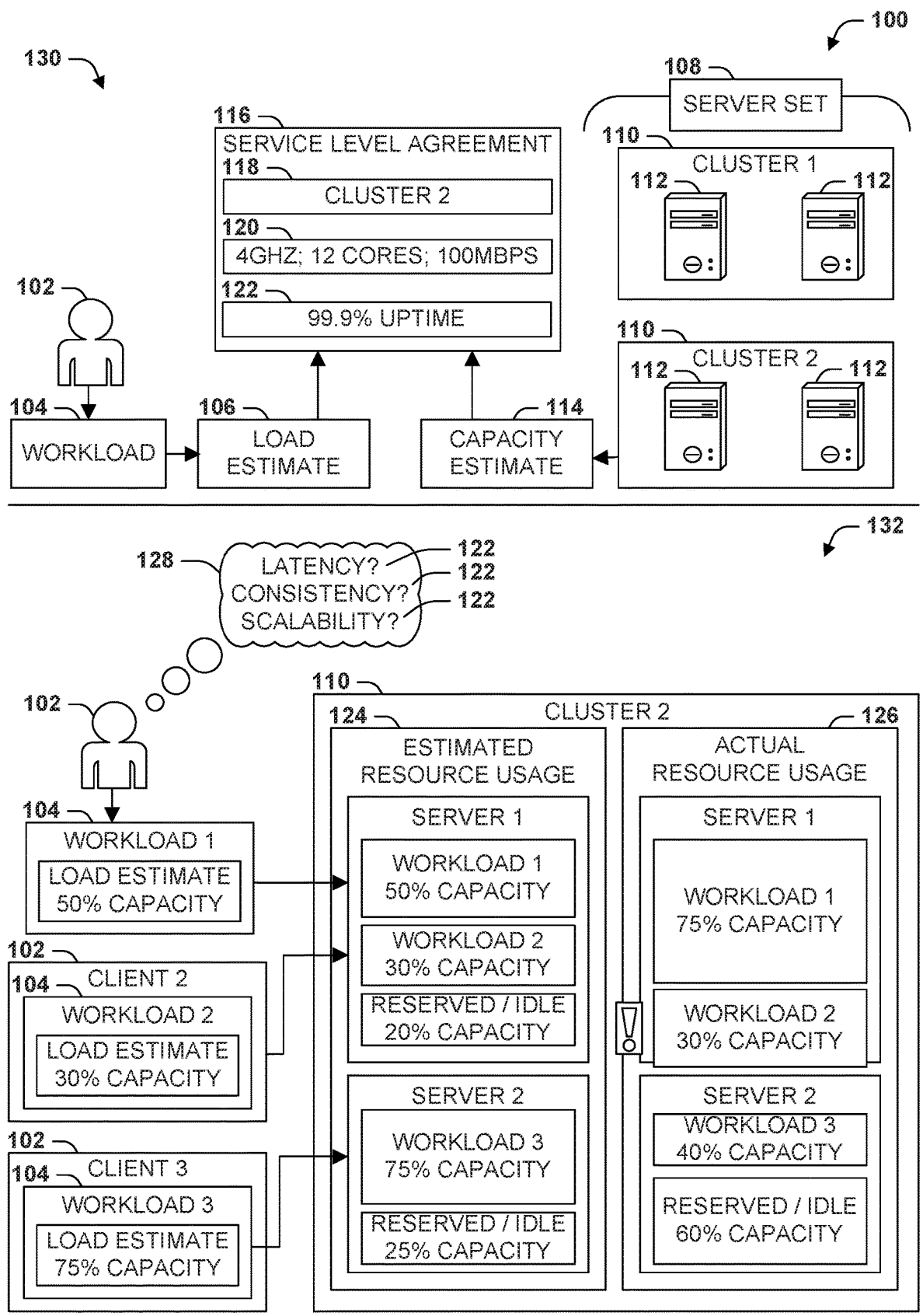
FIG. 1 is an illustration of a set of example scenarios respectively featuring an allocation of a server set for a set of workloads of a set of clients.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. Introduction

FIG. 1 is an illustration of an example scenario 100 featuring a typical distribution of a workload 104 over a server set 108. In this example scenario 100, during a service selection process 130, a client 102 requests the performance of the workload 104 by the server set 108, which may comprise a set of servers 112 that are arranged in various clusters 110, such as racks, groups, and/or geographic regions. The client 102 may have in mind a load estimate 106 of the computational load that the workload 104 is likely to utilize for the server set 108, such as server space, bandwidth, transaction volume, and expectations of accessibility and/or availability. The client 102 and an administrator of the server set 108 may negotiate a service level agreement 116 that describes the resources of the server set 108 that are to be allocated for the workload 104. For instance, the service level agreement 116 may specify a particular cluster 118 of servers 112 that are to be dedicated to the workload 104, such as the second cluster 110; the configuration 120 of the servers 112 in the cluster, such as the processor speed, core count, and network connectivity of the servers 112; and an availability guarantee, such as a commitment to ensure that the specified cluster 110 is available for 99.9% of the time.

The details of the service level agreement 116 may be offered by the administrator of the server set 108 as a good match for the load estimate 106 of the workload 104. Alternatively, the server set 108 may offer a variety of service tiers with accompanying service level agreements 116 that generally provide a capacity estimate 114 of the computational loads that each tier is capable of providing, and the client 102 may select the service tier and the service level agreement 116 that provide a set of resources with a capacity estimate 114 that is likely to satisfy the load estimate 106 of the workload 104. When the service level agreement 116 is selected, the server set 108 may dedicate the described resources, and the administrators of the server set 108 may endeavor to maintain any guarantees provided in the service level agreement 116, e.g., providing a sufficient number of servers 112 in a dedicated cluster 110 to provide the availability guarantee even in the event of the failure of a server 112. In this manner, the client 102 may utilize the server set 108 to perform the workload 104 in a manner that is anticipated to satisfy the load estimate 106.

The typical service selection process 130 illustrated in the example scenario 100 of FIG. 1 may be satisfactory for many applications. However, in some instances, this typical manner of selecting a service level agreement 116 that specifies a set of resource to be allocated for the workload 104 may exhibit some disadvantages, particularly as the server set 108 performs the workload 104.

As a first example, the client 102 and/or an administrator of the server set 108 may have underestimated the workload 104, such that the selection of resources specified in the service level agreement 116 may be inadequate. For example, the workload 104 may involve a higher degree of computational evaluation, a greater consumption of bandwidth, and/or a higher sensitivity to downtime than the client 102 had predicted as part of the load estimate 106. Alternatively or additionally, the client 102 and/or an administrator of the server set 108 may have overestimated the performance of the selected servers 112, such that the collection of resources provided by the server set 108 may be inadequate to fulfill the workload 104. As another example, the client 102 and/or administrator may have deliberately underprovisioned the set of available resources with an expectation of expanding at a later time as the workload 104 increases. In such cases, the resources of the server set 108 that are allocated to fulfill the service level agreement 116 may therefore provide unsatisfactory service for the workload 104. However, it may be difficult to expand the portion of the server set 108 that is allocated under the service level agreement 116 to increase the resources provided to the workload 104; e.g., the server set 108 may not have available resources to add to the service level agreement 116, and/or such expansion may involve a reconfiguration of the workload 104 and/or the servers 112 in a manner that disrupts the continued provision of the workload 104. As a result, the workload 104 may be underserviced with by inadequate volume of computational resources, causing performance guarantees to fail, and may cause requests such as transactions to incur delays and even fail due to timeout. Clients of the workload 104 may experience poor responsiveness of the workload 104, inconsistencies, failures, or data loss, including a failure of additional performance guarantees that are contingent upon the workload 104.

As a second example, the client 102 and/or administrator of the server set 108 may have overestimated the workload 104, and/or may have underestimated or overprovisioned the resources of the server set 108 allocated for the service level agreement 116. For example, the client 102 may have predicted a higher volume of traffic for a service than the service receives; may anticipate a greater computational demand involved in completing the tasks of the workload 104; and/or may optimize the workload 104 to consume fewer resources. A client 102 or administrator with a high degree of risk aversion may overprovision the resources for the workload 104, expecting ample computational capacity to service the workload 104 and/or satisfy the guarantees of the service level agreement 116 even if the load estimate 106 is underestimated or the capacity estimate 114 is underestimated. Such overprovisioning may occur deliberately, with an expectation by the client 102 or administrator that the resources may be scaled back at a later time once the actual load consumed by the workload 104 and/or the actual performance of the allocated resources is known. However, in such cases, computational resources remain underutilized, such as idle computational capacity and unused network bandwidth and/or storage. It may not be possible to reallocate the idle resources to other workloads, because demand for the workload 104 may increase unexpectedly, which may cause a failure of the service level agreement 116 if previously allocated but idle resources have been reallocated to other tasks. Additionally, it may be difficult to scale back the resources allocated for the workload 104 at a later time to reduce idleness; e.g., the workload 104 may be configured to utilize a number of servers 112, such as partitioning a task into slices that are handled by different servers 112, and reducing the number of servers 112 may involve reconfiguring the allocation of the workload 104. As another example, the administrator of the server set 108 may have acquired and deployed servers 112 to satisfy the service level agreement 116 based on the load estimate 106 and the capacity estimate 114, and may not have an alternative workload 104 on hand to which the idle resources may be productively reallocated. As a result, the server set 108 may have resources that are not just underutilized but completely unallocated.

As a third example, the service level agreement 116 may initially be adequate, but may become inadequate due to circumstantial changes. As a first such example, during an initial period, the workload 104 may receive a first volume of requests that is comfortably within the capacity estimate 114, but demand for the workload 104 may grow over time to a point that exceeds the initial load estimate 106 and the capacity estimate 114. As a second such example, the workload 104 may experience an initial surge of requests that satisfies the capacity estimate 114, but demand for the workload 104 may fade such that computational resources allocated to the workload 104 become increasingly idle. As a third such example, the client 102 may add features to the workload 104 that increase the load estimate 106, and/or may remove features and/or optimize the workload 104 in a manner that imposes a lower computational load, leading to either an inadequacy or an idleness of the computational resources allocated for the workload 104. As a fourth such example, an administrator of the server set 108 may increase the computational capacity of the resources allocated for the workload 104 (e.g., upgrading servers 112 or optimizing software), which may provide more computational capacity than the workload 104 consumes. In such cases, changing circumstances may transform an initially acceptable service level agreement 116 into an overallocation or underallocation of computational resources for the workload 104, and altering the allocation of resources for or away from the workload 104 may be difficult.

As a fourth example, a typical service level agreement 116 such as illustrated in the example scenario 100 of FIG. 1 may not adequately address a number of concerns of the client 102. As a first such example, the client 102 may have an interest 128 in a number of performance dimensions 122, such as latency (e.g., end-to-end throughput for particular tasks); consistency (e.g., fulfillment by the server set 108 of various consistency models, such as guaranteeing that updates will be propagated within a fixed time); and scalability (e.g., the option of increasing and/or decreasing the allocated resources as the workload 104 changes). The service level agreement 116 may not directly address such performance dimensions 122, but instead may offer resources that, in the estimation of the client 102 or an administrator of the server set 108, may be adequate for such performance dimensions 122. For example, the server set 108 may not be organized to provide any guarantee of latency for the workload 104, but may offer a cluster 110 of servers 112 that, theoretically, are likely to capable of performing with acceptable latency in typical operating conditions. The indirect relationship between the service level agreement 116 and the performance dimensions 122 that are of interest 128 to the client 102 may be inadequate, thus reducing the ability of the client 102 to plan for demand. Alternatively, such estimates may be inaccurate; e.g., the allocation of a cluster 110 that is theoretically adequate to provide low latency may in reality exhibit unacceptably high latency due to performance bottlenecks, or may comprise an overabundance of resources for the workload 104 that results in idleness and poor efficiency in the allocation of the server set 108.

As a particular example, a workload 104 may comprise a number of tasks that each consumes a different set of computational resources. The individual tasks may involve different types of resources (e.g., a first task may be computationally intensive but only consume a small amount of memory or bandwidth, while a second task may involve significant storage and network capacity but relatively little computation), and/or may be sensitive to different performance dimensions 122 (e.g., the first task may be sensitive to latency but may involve relaxed consistency, whereas a second task may involve stringent consistency but may tolerate high latency). It may be difficult for the client 102 to determine the resource demands of the respective tasks and/or the performance dimensions 122 to which the individual tasks are sensitive. It may also be difficult for the client 102 to determine the relative proportion of each task comprising the workload 104, particularly if such proportions change over time. The client 102 may be limited to generalized load estimates 106 of the workload 104 as a whole, which may be oversimplified and therefore inaccurate as an overestimate or underestimate.

Similarly, an administrator of one or more servers 112 may have difficulty determining the allocation of computational resources for one or more workloads 104 based on generalized load estimates 106 and capacity estimates 114, due to the varying types and rates of computational resources that different workload 104 and individual tasks utilize, and based on the different performance dimensions 122 to which the workloads 104 are sensitive. As a first example, an administrator may be informed that a first workload 104 presents a high sensitivity to latency 122 but not sensitive to resiliency against data loss, while a second workload 104 is relatively tolerant of latency but is highly sensitive to data loss. The administrator has difficulty determining whether allocating the workloads 104 to the same server 112 as the first workload 104 is likely to jeopardize the latency expectation for the first workload 104 and/or the data loss sensitivity of the second workload 104, due to the absence of any way to compare the respective demands with the capacity of the server 112. As a second example, a client 102 may wish to alter the performance expectations of a particular workload 104. For instance, the client 102 may have secured a service level agreement 116 that is based on a low-latency guarantee, but may find that the demand for the workload 104 is more sensitive to availability and scalability than latency; i.e., consumers of the workload 104 may be willing to tolerate longer response times as long as responses are reliably provided at all times, even when demand for the workload 104 is high. Accordingly, the client 102 may wish to relax the low-latency guarantee in exchange for adding or expanding availability and scalability guarantees. However, an administrator of the server set 108 may have difficulty determining how to reconfigure the allocation of the server set 108 to accommodate these requests. In some cases, the administrator may be unable to provide such extended guarantees if the administrator is unable to identify a reconfiguration of the server set 108 that is likely to fulfill such guarantees. Alternatively or additionally, the administrator may be unable to reallocate the servers 112 in a manner that conforms to the relaxed latency guarantee, and may have to maintain the allocation of computational resources that provides the low-latency guarantee even if the client 102 has no such expectation, rather than reallocating the extra computational resources to other workloads 104.

Multitenancy scenarios may exacerbate the consequences of poor allocation of the server set 108. In the example scenario 100 of FIG. 1, at a second time 132, a particular cluster 110 of servers 112 may have been allocated to handle three workloads 104 on behalf of three clients 102 based on load estimates 106 provided thereby. The capacity estimates 114 of the cluster 110 may enable an allocation of computational resources based on the estimated resource usage 124 for each server 112. such as a number of servers 112 allocated to each workload 104 or a proportion of computational resources of a particular server 112. For instance, a particular server 112 may be allocated to provide 50% of computation for the first workload 104 and 30% of computation for the second workload 104, and with a 20% computational capacity held in reserve for surges in demand, other workloads 104, or maintenance tasks. However, the actual resource usage 126 of the workloads 104 may vary from the estimated resource usage 124 for a variety of reasons. As a first such example, the first workload 104 may consume more than the anticipated resource usage, e.g., if the load estimate 106 was underestimated or if the capacity estimate 114 of the servers 112 to service the workload 104 was overestimated. Some overconsumption may reduce or eliminate the availability of reserved computational resources to address a modest increase of the second workload 104. Further overconsumption may reduce the computational resources of the server 112 for the second workload 104 and result in the failure of a performance guarantee for a service level agreement 116 for the second client 102, even if the second workload 104 remains within or even below its load estimate 106. As a second such example, a second server 112 may have been dedicated to a third workload 104 for a third client 102, but the actual resource usage 126 of the third workload 104 may be well below the estimate. As a result, the second server 110 may have idle computational resources that are not being used by the third workload 104, and yet cannot be allocated to other tasks, including the first workload 104, because such reallocation may cause a failure of a service level agreement 116 for the third workload 104 if its computational load increases in the future. As a third such example, one or more of the workloads may exhibit poor performance along a particular performance dimension 122 that is not addressed by any of the service level agreements 116; e.g., the workloads 104 may meet an availability guarantee, such as 99.9% uptime, but may exhibit latency that is above an expectation of a client 102. Although nominally in compliance with the service level agreement 116, the server set 108 may nevertheless fail the performance expectations of the client 102 for the workload 104.

It may be appreciated that these limitations exist, at least in part, due to the difficulty of comparing the computational demands of different workloads 104, and/or the performance dimensions 122 of various workloads 104 and associated performance guarantees. That is, a generalized understanding of computational performance of servers 112 and clusters 110, and a generalized load estimate 106 of a workload 104 comprising numerous tasks with varying computational resource consumption and sensitivities to various performance dimensions 122, may enable only holistic estimates of computational load and computational performance, which may be inaccurate in numerous ways. Such complexities are exacerbated by variations in the available servers 112 (e.g., how the performance of a high-capacity server 112 compares with the performance of a cluster of low-capacity servers 112 for a particular task). The absence of visibility and detail about these aspects reduces the proficiency with which computational resources may be matched to workloads 104; e.g., a client 102 may be limited to selecting between a "high-performance" server 112 and a "medium-performance" server 112, without any relative comparison of performance characteristics or with the computational demands of the workload 104. The resulting estimation errors may lead to either a failure of performance guarantees and expectations or an overallocation of computational resources that incurs excessive idleness and overprovisioning. Both clients 102 and administrators may be unable to plan such allocations in advance, and may have to rely on ad-hoc techniques that depend upon rapid responses of adding or removing resources as observations of actual resource usage 126 are attained and compared with estimated resource usage 124. These and other disadvantages may arise from the misallocation of the resources of the server set 108 based on the inadequacy of typical service level agreements 116 and resource allocation strategies.

B. Presented Techniques

Presented herein are techniques for allocating workloads 104 based on a standardized service unit metric. Workloads 104 may be evaluated to determine a particular number of service units that are involved in completing a unit of the workload. The number of service units for a workload unit may reflect the consumption of computational resources, such as processing time, storage, and network utilization, as well as the expectations and dependencies of the workload unit upon various performance dimensions 122, such as sensitivity to high latency or gaps in availability; dependency upon a particular consistency model; and/or the risks and significance of data loss. The resource dependencies of a workload unit may be assessed, and in some cases may be assessed for different types of workload units, such as different tasks or features that are provided by the workload 104. A client 102 who is informed of the service units involved in each workload unit may specify a rate of workload units to be performed for the workload 104, resulting in a service unit rate that the client 102 wishes to secure by the server set. Additionally, the performance of a particular server 112 may be assessed in terms of the rate of service units that the server 112 is capable of fulfilling per unit of time. For instance, a server 112 that exhibits a performance of fifty service units per minute may be allocated to fulfill ten workload units per minute for a first workload 104 that consumes five service units per workload unit, or to fulfill five workload units per minute for a second workload 104 that consumes ten service units per workload unit, or a combination thereof. The use of a service unit therefore provides a standardized metric of evaluating computational load, sensitivity to performance dimensions 122 and performance guarantees, and the computational resources and capabilities of servers 112, which may enable a more accurate and therefore efficient allocation of servers 112 to workloads 104 in accordance with the techniques presented herein.

Figure 2:
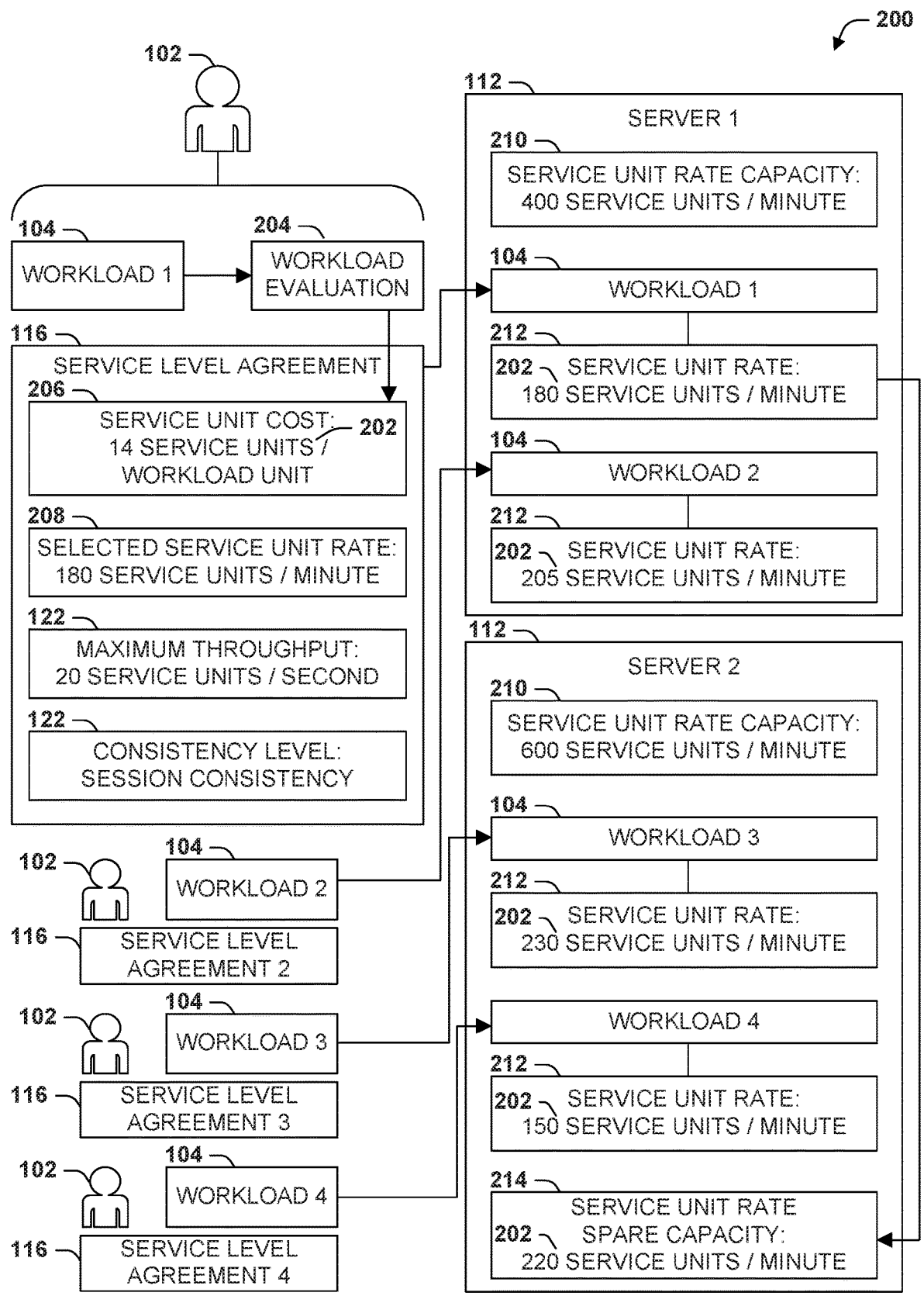
FIG. 2 is an illustration of a set of example scenarios respectively featuring an allocation of a server set for a set of workloads of a set of clients in accordance with the techniques presented herein.

FIG. 2 is an illustration of an example scenario 200 featuring an allocation of two servers 112 to fulfill four workloads 104 with different computational resource consumption and sensitivities to performance dimensions 122, using a heterogeneous server set 108 of servers 112 with different performance characteristics and computational capacity. In accordance with the techniques presented herein, these diverse factors may be both quantified and standardized as a measure of service units 202 to enable a more efficient allocation of workloads 104 to servers 112.

As shown in this example scenario 200, various workloads 104 may be subjected to a workload evaluation 204 to determine a service unit cost 206 as a number of service units 202 that are involved in completing a workload unit of the workload 104. For example, a first workload 104 may be estimated as consuming fourteen service units 202 per workload unit. The service unit cost 206 for the workload unit of a workload 104 may reflect the computational resources that are consumed by the workload unit (e.g., the amount of processing time, storage capacity, and/or network bandwidth utilized in completing the workload unit) and/or the sensitivity of the workload unit to various performance dimensions 122 (e.g., whether the workload unit is expected to satisfy a particular consistency level, such as session-based consistency in which the views of the workload 104 within each session remains consistent). Based on the workload evaluation 204, the client 102 of the workload 104 may be provided with a service level agreement 116 that sets forth the service unit cost 206 for each workload unit of the workload 104. The service level agreement 116 may also include a service unit rate 208 of service units 202 to be allocated for the server set 108 to fulfill the workload 104 during each unit of time. For instance, the server set 108 may commit to providing 180 service units per minute, which, for a workload 104 that is evaluated at a service unit cost 206 of fourteen service units 202 per workload unit, translates to a typical completion of 12.8 workload units of the workload 104 per minute. The service level agreement 116 may also set forth other performance guarantees of various performance dimensions 122 during the provision of the service to the workload 104, such as the availability to scale up to a maximum throughput of twenty service units 202 per second for the workload 104 in the event of a surge in demand. Similar workload evaluation 204 may be performed for other clients 102 submitting other workloads 104, resulting in a collection of service agreements 116 that are specified in terms of service unit costs 206 for workload units of the workloads 104 and the service unit rates 208 that are selected by the various clients 102 for the workloads 104.

As further shown in this example scenario 200, the server set 108 comprising two servers 112 is provided for allocation to workloads 104. The servers 112 exhibit different performance; e.g., the first server 112 may comprise a less performance and/or lower-capacity collection of computational resources than the second server 112. However, rather than generalized and qualitative assessments of the performance capabilities, an administrator of the server set 108 may identify a service unit rate capacity 210 for each server 112, as a rate of service units 202 that each server 112 is capable of providing. That is, the service unit 202 reflects a volume of computational resources that are consumed by the server 112 in completing one service unit 202 of a workload 104. Additionally, each server 112 may be measured in terms of a service unit rate 212, i.e., the number of service units 202 that the server 112 is capable of completing per unit of time, such as per minute. For instance, the first server 112 is measured as exhibiting a service unit rate capacity 210 of completing 400 service units 202 per minute. The first server 112 may therefore be allocated to complete 400 workload units per minute of a first workload 104 that consumes one service unit per workload unit; or 100 workloads per minute of a second workload 104 that consumes four service units per workload unit; or 10 workload units per minute of a third workload 104 that consumes 40 service units per workload unit. The rates may also be amortized per unit of time; e.g., if each workload unit consumes 40 service units, the server 112 may be allocated either to complete ten workload units per minute, or to complete 100 workload units per each ten-minute period—both of which translate to a service unit rate 212 of 400 service units 202 per minute.

The workload evaluations 204 of the workloads 104 in terms of service unit costs 206 and selected service unit rates 208, and the measurement of service unit rate capacities 210 of the respective servers 112, provides a standardized and quantifiable mechanism for allocating the workloads 104 to the servers 112. For example, the first server 112 may be measured with a service unit rate capacity 210 of 400 service units per minute, and may therefore be allocated two workloads 104 that respectively involve service unit rates 212 of 180 service units per minute and 205 service units per minute. Because the workloads 104 have been evaluated through a workload evaluation 204 that takes various performance dimensions 122 into account in identifying the service unit costs 206 of the workload 104, the allocation of workloads 104 to the first server 112 properly reflects the expectations and guarantees presented in the service level agreements 116; e.g., the second workload 104 allocated to the server 112 may involve a high consistency guarantee for a smaller number of workload units of the workload 104 to be completed per minute, or a low consistency guarantee for a larger number of workload units of the same workload 104 to be completed per minute.

Similarly, the computational capabilities of the second server 112 are quantified as a service unit rate capacity 210 of 600 service units per minute. The second server 112 is allocated for two workloads 104 respectively involving service unit rates 212 of 230 service units per minute and 150 service units per minute. Accordingly, the second server 112 may be identified as having spare computational resource capacity to fulfill additional workloads 104 at a rate of 220 service units per minute. Such capacity may be allocated to a different workload 104, or held in reserve (e.g., in case one of the clients 102 requests an increase in the selected service unit rates 208 for the third workload 104 or the fourth workload 104, either to expand the rate of workload units completed per minute or to increase a performance guarantee of the workload 104 while maintaining the current rate of workload units completed per minute). In this manner, the spare capacity of the second server 112 may be accurately quantified and rapidly deployed for new tasks without jeopardizing the reservation of computational resources for the existing workloads 104 (i.e., the service unit rates 212 that are allocated for each workload 104 as a portion of the total service unit rate capacity 210 of the server 112). In this manner, the use of service units 202 as a standardized and quantifiable metric of the computational costs of workloads 104 based on performance guarantees, and the computational capacities of servers 112, as well as the use of service unit rates 212 as a metric of throughput, enable a more accurate and efficient allocation of server resources to workloads 104 in accordance with the techniques presented herein.

C. Technical Effects

The allocation of workloads 104 to servers 112 based on service units as a quantifiable metric, as well as the service unit rate as a metric of workload units completed per unit of time, may provide one or several of the following technical effects in the field of server allocation.

A first technical effect that may arise from the techniques presented herein involves the accurate allocation of computational resources of one or more servers 112 to service one or more workloads 104. As demonstrated in the contrasting examples of FIGS. 1 and 2, rather than a generalized and qualitative estimation of the computational capacity of a selected set of servers 112, the capacity of a server 112 may be quantified as a service unit rate capacity 210, such that the server 112 may be allocated a selected set of workloads 104 that are to be performed at various service unit rates 212 that, together, are within the service unit rate capacity 210 of the server 112. The server 112 may therefore be more accurately allocated to service workloads 104. Such accuracy and quantification reduce the incidence of overprovisioning (resulting in idle computational resources) and underprovisioning (resulting in resource shortages that interfere with the completion of the workloads 104 and potentially risking violation of performance guarantees in service level agreements 116). Such accuracy also enables administrators to allocate workloads 104 to servers 112 with greater confidence and precision. That is, in the absence of clear and quantifiable indications of the spare capacity of a server 112 after allocating a set of workloads 104, administrators may be inclined to underprovision the servers 112 with significant spare capacity, since the consequences of overestimating computational performance and violating consistency guarantees in service level agreements 116 tend to be much more significant and concerning than the consequences of underestimating computational performance and leaving some computational resources idle and unused. The use of service units and service unit rates as quantifiable metrics for allocation enables administrators to provision servers 112 more fully, thus increasing the efficiency and therefore overall output that is achievable by the servers 112 of the server set 108.

A second technical effect that may arise from the techniques presented herein involves the level of detail in information provided to clients 102 as to the allocation of servers 112 and computational resources for their workloads 104. For example, the workload evaluation 204 of a particular workload 104 enables the determination of a service unit cost 206 as the number of service units 202 per workload unit. The client 102 may forecast the number of workload units that can be completed by the server set 108 within a selected service unit rate 208. If the client 102 secures a service level agreement 116 with a selected service unit rate 208, the client 102 may determine an expectation of the anticipated throughput of the workload 104 (i.e., the number of workload units completed per unit of time). The client 102 may also receive an understanding of the comparative service unit costs 206 of different tasks within the same workload 104, such as the relative degree of resource consumption involved in a first task of reading transactional data vs. a second task of writing and committing transactional data. Additionally, the use of service units 202 and service unit rates 212 may enable the formulation of service level agreements 116 with a greater range of options that reflect the performance dimensions 122 of the workloads 104. For example, clients 102 may select among a range of options, such as latency guarantees, scalability (e.g., availability to scale to a maximum throughput in response to a surge in demand), consistency levels, durability (e.g., reduction of risks of data loss through replication of data), and/or accessibility (e.g., uptime). The respective options may involve an allocation of more or fewer servers 112 and computational resources, which may be reflected by adjusting the service unit costs 206 of performing each workload unit of the workload in view of the performance dimensions 122 of the service level agreement 116. The client 102 may therefore fine-tune the performance dimensions 122 as a set of tradeoffs with respect to throughput; i.e., the degree to which increasing the consistency level and durability of a workload 104, and the resulting increase in service unit cost 206, reduces the number of workload units that may be completed per unit of time within the selected service unit rate 208. The service as a whole may benefit from the capability of offering service level agreements 116 with such fine-grain tuning of various performance dimensions 122 in the manner of a tradeoff.

A third technical effect that may arise from the techniques presented herein involves the flexibility in the allocation of workloads 104 to servers 112. As a first example, a client 102 may receive a quantified determination of how changes to a workload 104 are likely to increase or decrease the rate of workload units completed per unit of time. For example, the client 102 may determine the degree to which optimizing the workload 104, reducing the feature set of a workload 104 and/or relaxing the expectations for various performance dimensions 122 (e.g., tolerating a higher degree of latency) may enable the server set 108 to complete more workload units per unit of time at the same selected service unit rate 208. Conversely, the client 102 may determine the degree to which increasing the feature set of a workload 104 and/or tightening the expectations for various performance dimensions 122 (e.g., selecting a stronger consistency level, such as raising from session consistency to bounded staleness consistency) may reduce the throughput of the server set 108, in terms of workload units per unit of time, at the same selected service unit rate 208. Similarly, administrators of the server set 108 may be more accurately informed of the capability of the server set 108, including individual servers 112, to handle fluctuations in workloads 104, such as whether a particular server 112 is capable of handling a surge of demand in a workload 104. For example, a particular workload 104 may typically involve 100 workload units per minute at a service unit cost 206 of 20 service units per workload unit, resulting in a total service unit rate 202 of 2,000 service units per minute. If the workload 104 is anticipated to surges by 20% (i.e., to 120 workload units per minute), the administrator may determine whether the service unit rate capacities 210 of the servers 112 over which the workload 104 is allocated are together capable of providing an additional 400 service units per minute. If so, the administrator may maintain the allocation of servers 102 for the workload 104, and may even offer a performance guarantee that such capacity is available in the event of a surge of up to 20%. If not, the administrator may endeavor to allocate more resources to the workload 104, or to advise the client 102 that such surge capacity is not currently available in the server set 108, including refraining from offering a performance guarantee to this effect. In this manner, the quantification of workloads 104 and computational capacity according to service units 202 and service unit rates 208 promotes resource planning and forecasting for various changes to the workloads 104 by both clients 102 and administrators. Many such advantages may arise from the allocation of workloads 104 to servers 112 using standardized and quantifiable service units 202 in accordance with the techniques presented herein.

D. Example Embodiments

Figure 3:
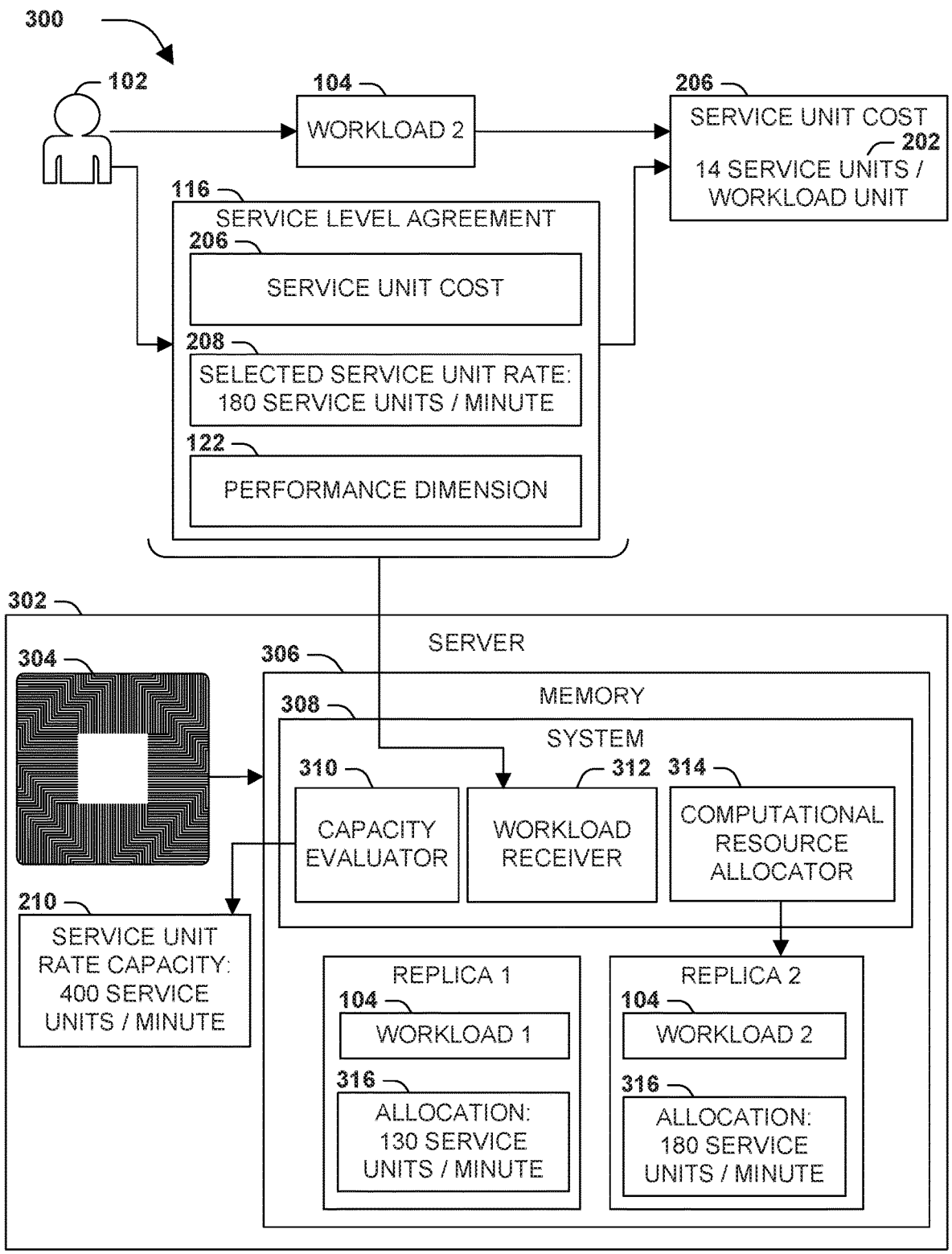
FIG. 3 is a component block diagram illustrating an example server featuring an example system for configuring a server to perform a portion of a workload for a client in accordance with the techniques presented herein.

FIG. 3 is an illustration of an example scenario 300 featuring some example embodiments of the techniques presented herein, including an example server 302 that services a set of workloads 104 and an example system 308 that causes the server 302 to service the workloads 104. The example server 302 comprises a processor 304 and a memory 306 (e.g., a memory circuit, a platter of a hard disk drive, a solid-state storage device, or a magnetic or optical disc) encoding instructions that, when executed by the processor 304 of the example server 302, cause the example server 302 to service the workloads 104 in accordance with the techniques presented herein.

The example system 308 comprises a capacity evaluator 310, which identifies a service unit rate capacity 210 of the server 302 as a rate of service units 202 that the server 302 is capable of providing, wherein the service unit 202 is a volume of computational resources of the server 302. For example, if the server 302 is capable of producing one hundred service units per minute, then the server 302 utilizes 1% of its computational resources to provide one service unit per minute. The example system 308 also comprises a workload receiver 312, which receives, from a client 102, a workload 104 that is associated with a service unit cost 206 that is consumed by a workload unit of the workload 104. The example system 308 also comprises a computational resource allocator 314, which receives an allocation request 316 to allocate computational resources of the server 302 to perform a portion of the workload 104 at a service unit rate. The computational resource allocator 314 may respond to the allocation request 316 by allocating, within the service unit rate capacity 210 of the server 302, a subset of computational resources of the server 302 that are capable of performing the workload 104 at the service unit rate 206. For example, if the allocation request 316 for a particular workload 104 involves a rate of ten service units per minute, and (as previously indicated) the server 302 has been measured to utilize 1% of its computational resources to process a workload 104 at the rate of one service unit per minute, then the allocation request 316 may be identified as a request to allocate 10% of the computational resources of the server 302 to service the workload 104 at the requested rate of ten service units 202 per minute. In this manner, the example system 308 may allocate the computational resources of the example server 302 to fulfill the performance guarantees for various performance dimensions 122 of a service level agreement 116 provided to a client 102 for the workload 104 through the use of service units 202 and service unit rates as a standardized and quantitative metric of workloads and computational capacity in accordance with the techniques presented herein.

Figure 4:
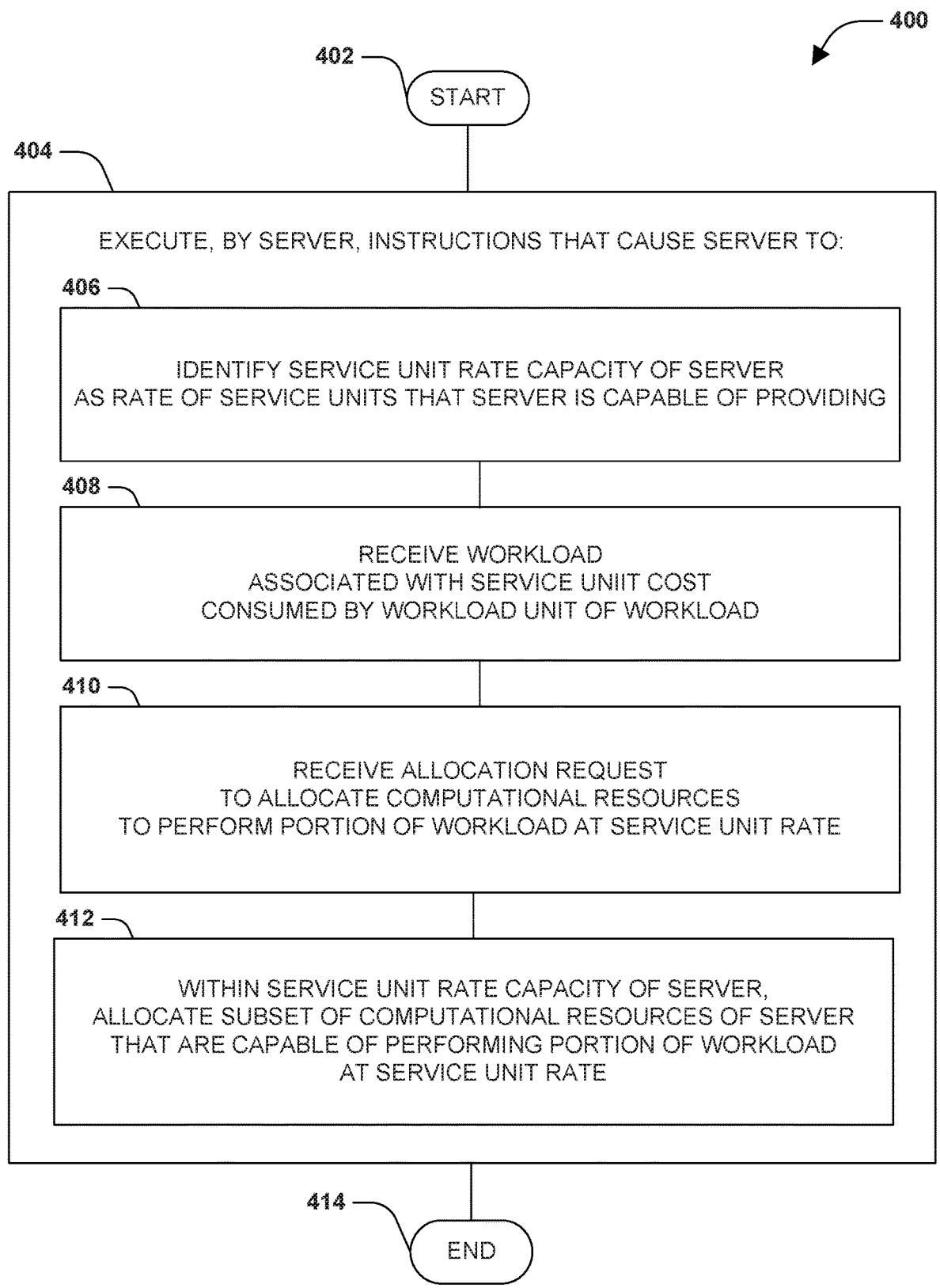
FIG. 4 is a flow diagram illustrating an exemplary method of configuring a server to perform a portion of a workload for a client in accordance with the techniques presented herein.

FIG. 4 is an illustration of an example scenario featuring a third example embodiment of the techniques presented herein, wherein the example embodiment comprises an example method 400 of allocating a server 112 to process a workload 104 in accordance with techniques presented herein. The example method 400 involves a server comprising a processor 304, and may be implemented, e.g., as a set of instructions stored in a memory 306 of the server, such as firmware, system memory, a hard disk drive, a solid-state storage component, or a magnetic or optical medium, wherein the execution of the instructions by the processor 304 causes the server 112 to operate in accordance with the techniques presented herein.

The first example method 400 begins at 402 and involves executing 404, by the server 112, instructions that cause the server to perform in the following manner. The execution of the instructions causes the server 112 to identify 406 a service unit rate capacity 210 of the server 112 as a rate of service units 202 that the server 112 is capable of providing, wherein the service unit 202 is a volume of computational resources of the server 112. The execution of the instructions also causes the server 112 to receive 408 a workload 104 that is associated with a service unit cost 206 that is consumed by a workload unit of the workload 104. The execution of the instructions also causes the server 112 to receive 410 an allocation request 316 to allocate computational resources of the server 112 to perform at least a portion of the workload 104 at a service unit rate 212. The execution of the instructions also causes the server 112 to allocate 412, within the service unit rate capacity 210 of the server 112, a subset of computational resources of the server 112 that are capable of performing at least the portion of the workload 104 at the service unit rate 212. In this manner, the example method 400 may enable the server 112 to execute the workload 104 in accordance with the techniques presented herein, and so ends at 414.

Figure 5:
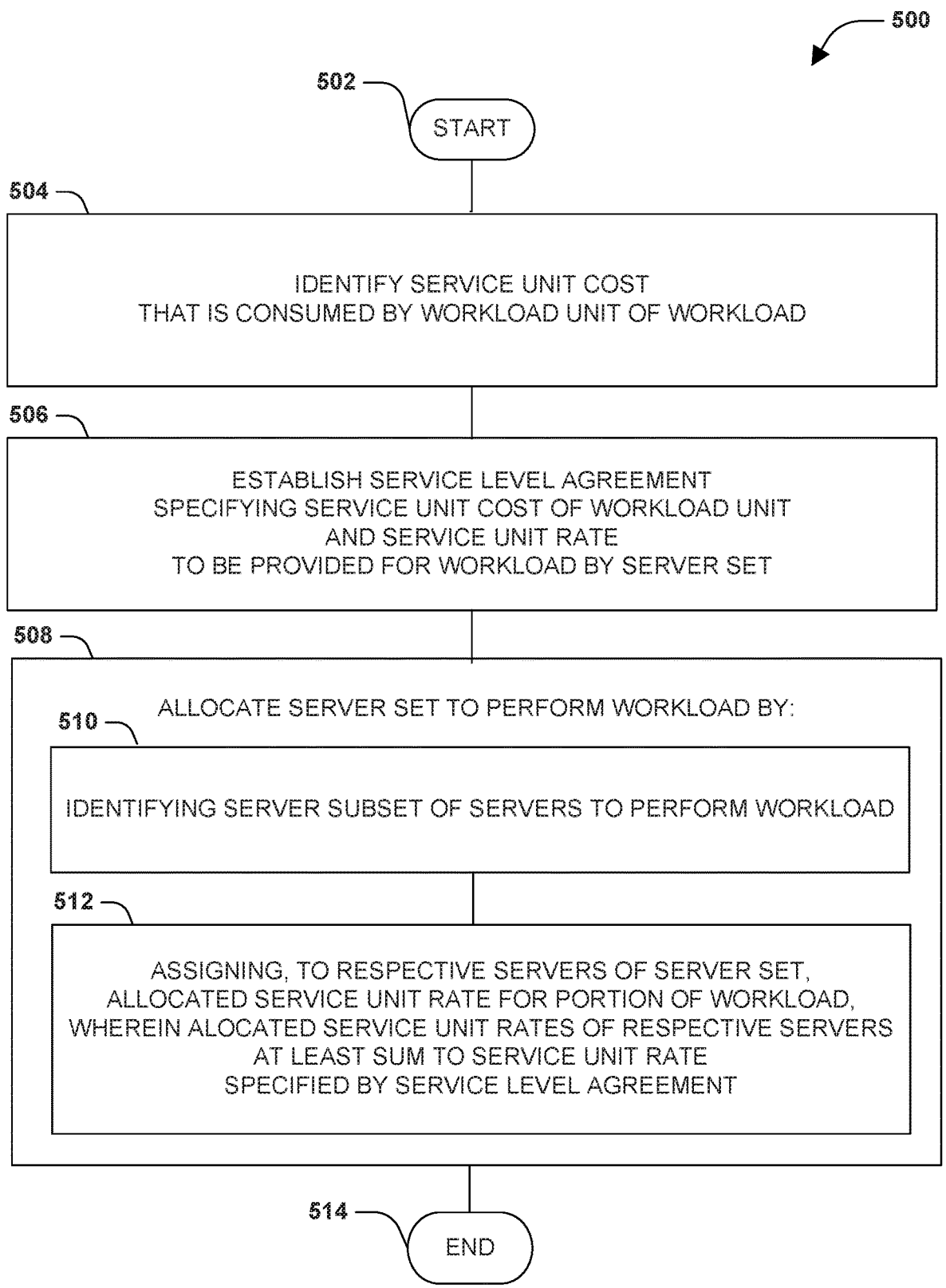
FIG. 5 is a flow diagram illustrating an exemplary method of configuring a server set to perform workloads for clients in accordance with the techniques presented herein.

FIG. 5 is an illustration of an example scenario featuring a fourth example embodiment of the techniques presented herein, wherein the example embodiment comprises an example method 500 of configuring a server set 108 of servers 112 to process a workload 104 in accordance with techniques presented herein. The example method 500 involves servers 112 that respectively comprise a processor 304, and may be implemented, e.g., as a set of instructions stored in a memory 306 of the respective servers 112, such as firmware, system memory, a hard disk drive, a solid-state storage component, or a magnetic or optical medium, wherein the execution of the instructions by the processor 304 causes the respective servers 112 to operate in accordance with the techniques presented herein.

The fourth example method 500 begins at 502 and involves identifying 504 a service unit cost 206 that is consumed by a workload unit of the workload 104, wherein the service unit cost 206 is based on a service unit 202 as a volume of computational resources. The example method 500 further involves establishing 506 a service level agreement 116 specifying the service unit cost 206 of the workload unit of the workload 104, and a selected service unit rate 208 to be provided for the workload 104 by the server set 108. The example method 500 further involves allocating 508 the server set 108 to perform the workload 104 by identifying 510 a server subset of servers 112 to perform the workload 104, and assigning 512, to respective servers 112 of the server subset, an allocated service unit rate 212 for a portion of the workload 104, wherein the allocated service unit rates 212 of the respective servers 112 at least sum to the selected service unit rate 208 specified in the service level agreement 116. In this manner, the example method 500 may enable the servers 112 of the server set 108 to execute the workload 104 in accordance with the techniques presented herein, and so ends at 514.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
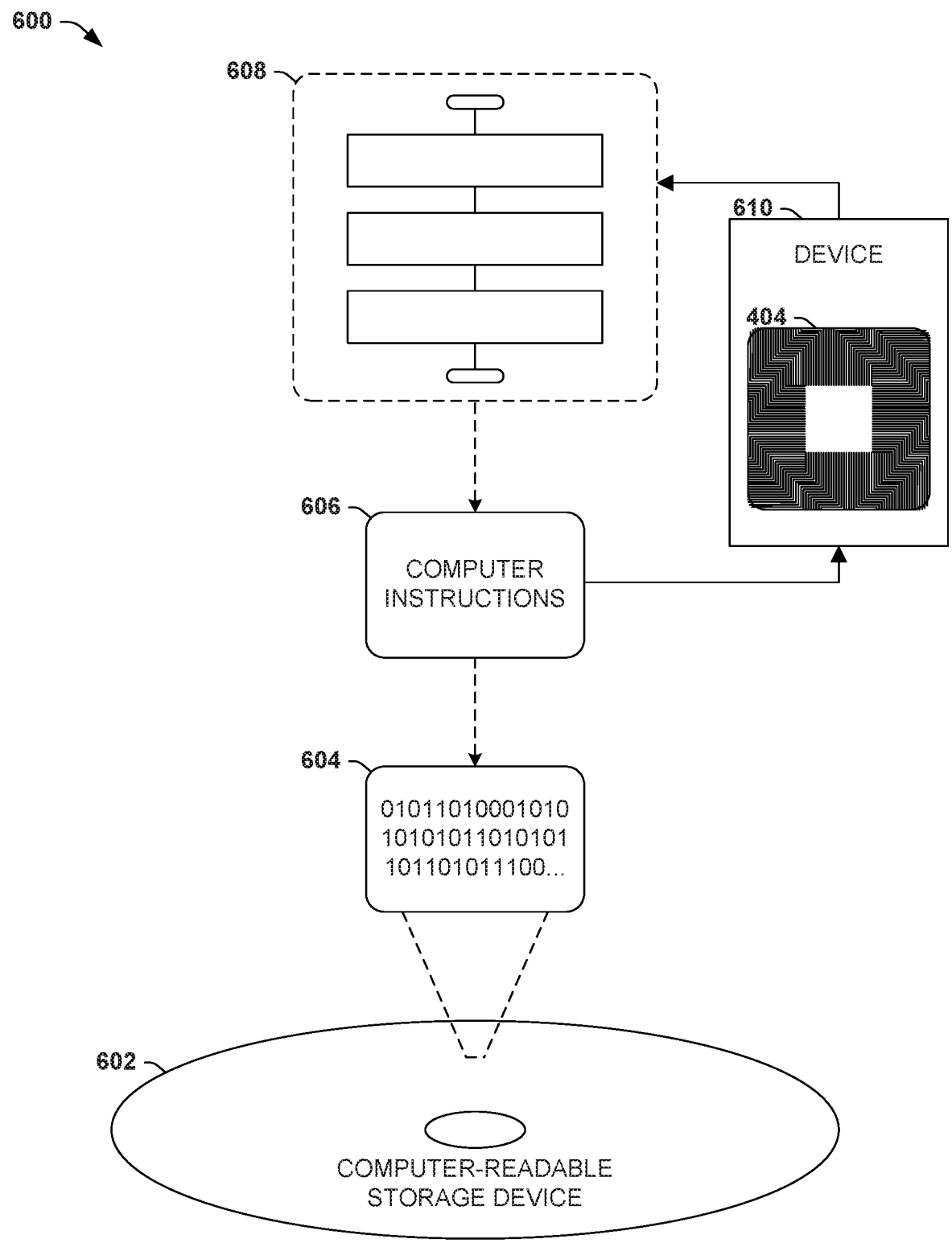
FIG. 6 is an illustration of an example computer-readable medium storing instructions that provide an embodiment of the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 304 of a server 112, cause the server 112 to operate according to the principles set forth herein. For example, the processor-executable instructions 606 may encode a system that causes a server 112 to execute a workload 104 according to a service level agreement 116, such as the example system 308 in the example scenario 300 of FIG. 3. As another example, the processor-executable instructions 606 may encode a method of configuring a server 112 to perform a workload 104, such as the example method 400 of FIG. 4. As yet another example, the processor-executable instructions 606 may encode a method of configuring a server set 108 of servers 112 to perform a workload 104, such as the example method 500 of FIG. 5. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the first example method of FIG. 4; the second example method of FIG. 5; and the example device 602 and/or example method 608 of FIG. 6) to confer individual and/or synergistic advantages upon such embodiments.

E1. Scenarios

A first aspect that may vary among implementations of these techniques relates to scenarios in which the presented techniques may be utilized.

As a second variation of this first aspect, the presented techniques may be utilized with a variety of servers 112, such as workstations, laptops, consoles, tablets, phones, portable media and/or game players, embedded systems, appliances, vehicles, and wearable devices. The servers 112 may also comprise a collection of server units, such as a collection of server processes executing on one or more devices; a personal group of interoperating devices of a client 102; a local collection of server units comprising a computing cluster; and/or a geographically distributed collection of server units that span a region, including a global-scale distributed database. Such devices may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication). Additionally, such workloads 104 may be performed in the context of various server configurations, such as a client process on the server 112 performing the workload 104; other servers 112 within a server group; and/or various client devices that utilize the server 112 and/or server group on behalf of one or more clients and/or other devices.

As a second variation of this first aspect, the presented techniques may be utilized a variety of workloads 104, such as, processing queries over a data set; presented or streaming media; generating content, including rendering graphics; presenting a website or web service, such as a social network; various forms of simulation; and artificial intelligence applications, such as classification, pattern recognition, image processing, and/or natural language processing. Additionally, the presented techniques may be utilized with workloads 104 that involve a variety of data and databases featuring a variety of data models, such as a relational database comprising tabular data organized into tables comprising sets of attributes and sets of rows presenting values for the respective attributes; graph data comprising a graph of nodes with interconnecting edges; key/value pairs of keys and associated values; and documents provided as structured or unstructured collections of entities. Such databases may also be used in a variety of circumstances, such as data warehousing; content provided through a content system such as a webserver; and object systems for an application or operating system. Additionally, the workloads 104 may be processed on behalf of the administrator of the server set 108, or a set of clients that are internal to an enterprise (e.g., an enterprise-level internal database processing system), and/or on behalf of third parties. The workloads 104 may be processed concurrently and/or consecutively with varying levels of multitenancy and/or security. Many scenarios may be devised in which a server set 108 is allocated to process a set of workloads 104 in accordance with the techniques presented herein.

E2. Measuring Service Unit Costs

A second aspect that may vary among embodiments of the presented techniques involves the workload evaluation 204 of a workload 104 to identify the service unit cost 206 of processing a workload unit of the workload 104, as measured in service units 202.

As a first variation of this second aspect, a workload unit 104 may comprise a sequence of operations to be performed, such as a set of queries to be executed over a database. The service unit cost 206 of performing the workload unit of a workload 104 may be established by ascribing a per-operation service unit cost to the individual operations, and summing the respective service unit costs of the operations to determine the service unit cost 206 of the entire workload unit.

The per-operation service unit costs 206 of the respective operations may be assessed in a variety of ways. In some cases, the per-operation service unit costs 206 may be determined by examining the intrinsic properties of the operations and considering the manner in which the operation is achieved. As a first such example, the per-operation service unit costs 206 may be determined by a volume of data involved in the operation, such as a number of database records or an aggregate data size, or a computational intensity involved in performing the operation (e.g., some operations may involve merely reading or writing data, while other operations may involve resource-intensive operations such as compression, decompression, encryption, or statistical analysis). As a second such example, the per-operation service unit costs 206 may be determined according to the scale of computational resources that are likely involved in the operation, such as an amount of storage, memory, or network bandwidth that are utilized by the operation, or a duration of a processor or number of processing cores that the operation is likely to utilize. As a third such example, the per-operation service unit costs 206 may be determined by an operation type, wherein respective operation types may be generally associated with a service unit cost (e.g., identifying a first service unit cost for read operations and a second, higher service unit cost for write operations). The service unit cost 206 of a workload unit of the workload 104 may therefore be determined by summing the respective service unit costs 206 of the operation types of the respective operations of the sequence comprising the workload unit. As a fourth such example, the per-operation service unit costs 206 may be determined according to an impact of the operation on the server set 108. For instance, operations that depend upon tight concurrency (e.g., a number of processing cores working together in coordinated lockstep, such as a transaction) may be assessed a higher per-operation service unit cost 206 than operations that involve relaxed or no concurrency issues, wherein various operations may be completed in no particular sequence. As yet another example, an operation that involves a long-running commitment of resources, such as an uninterruptible task, may be assessed a higher per-operation service unit cost 206 than operations that are rapidly completed and/or may be completed piecemeal.

Alternatively or additionally, the per-operation service unit costs may be determined not necessarily by the intrinsic properties of the operation, but by a context in which the operations are to be completed. As a fifth such example, the per-operation service unit costs 206 may be determined according to a significance of the operation, such as a timeliness with which the operation is to be performed (e.g., high-priority and/or time-sensitive operations that are due to completed within a fixed and potentially short time frame) may be assessed a higher per-operation service unit cost than operations that may be completed at any time, including when servers are otherwise idle and/or plentiful. As a sixth such example, some operations may be governed by certain performance characteristics and/or regulatory requirements, such as a regional restriction within which certain data involved in an operation is to be retained and/or certain operations are to be executed. Because the constraints placed upon the operation may be satisfied only by a particular arrangement of resources of the server set 108 (e.g., displacing a first workload that is being performed in a particular region, but that has no geographic restrictions, to provide processing capacity for a second workload that is bound by a geographic restriction within the particular region).

As a fourth variation of this second aspect, a service level agreement 116 may specify a consistency level to be applied for the workload 104. For example, the service level agreement 116 may specify that a workload 104 is to be performed within bounded staleness consistency, e.g., an expectation that a write request will be committed to and apparent from every server in the server set 108 within a predictable duration of initiating the write request. The service unit cost 206 of a workload unit of the workload 104 may be determined according to the service unit cost 206 of performing the workload 104 at the consistency level specified in the service level agreement 116 (e.g. performing a workload unit of a workload 104 with a guarantee of bounded staleness consistency may entail a higher service unit cost 206 than performing the same workload unit of the same workload 104 with only a guarantee of eventual consistency). Because configuring a server to perform the workload unit in a manner that guarantees fulfillment of a more stringent consistency level may entail the allocation and/or expenditure of more resources—e.g., establishing a higher priority for processing and network transfer, securing and/or maintaining exclusive access locks over high-demand resources, and/or holding resources in reserve until the workload unit is complete—it may be advantageous to assess a higher service unit cost to the workload 104 as a load-balancing mechanism that more accurately reflects the computational demands of the workload 104, even if the sequence of operations involved in the workload 104 appears to be simple and/or easily completed.

As a fourth variation of this second aspect, a service level agreement 116 may guarantee a performance dimension set of one or more performance dimensions within which the workload 104 is to be performed. As a first example, the workload 104 may have to be performed in accordance with an availability dimension, e.g., a percentage of time and/or geographic distribution over which the workload 104 is capable of being performed by the server set 108. As a second example, the workload 104 may have to be performed in accordance with a latency dimension, e.g., a maximum amount of time between submission of the request for the operation and notification that the operation has been completed. As a third example, the workload 104 may have to be performed in accordance with a throughput dimension, e.g., a volume of workload units of the workload 104 that the server set 108 is capable of processing in a unit of time, such as an estimated demand. The service unit costs 206 of the workloads 104 may be determined at least in part by the performance dimension set of the service level agreement 116; e.g., a workload 104 presenting a complex performance dimension set comprising numerous and/or stringent performance dimensions may be assessed a higher per-workload-unit service unit cost 206 than a workload 104 involving a service level agreement 116 specifying fewer and/or less stringent performance dimensions.

As a fifth variation of this second aspect, the service unit cost 206 of a workload 104 may be determined proactively, e.g., by examining the details of the workload 104 and projecting a number of service units 202 of computational resources that are consumed by a server 112 in completing a workload unit of the workload 104. A variety of heuristic techniques may be utilized, e.g., general estimates of the service unit costs 206 of typical operations such as those included in the workload 104, and/or comparison of the workload 104 with similar workloads 104 for which service unit costs 206 have previously been identified. Alternatively or additionally, the service unit cost 206 of a workload 104 may be determined by monitoring the actual resource expenditure of a server 112. A specific example of such techniques may involve a workload 104 comprising a query to be applied to a database. The service unit cost 206 of the workload 104 may be identified executing the query on a selected server 112, and while executing the query, performing a measurement a volume of computational resources of the server 112 that are consumed by the query. The service unit cost 206 of the workload 104 may be identified according to the measurement of the volume of computational resources involved in completing the query. Such determination may occur on a trial basis (e.g., executing a workload unit on a test server 112, and/or simulating the execution of a workload unit on a simulated server 112, and monitoring resource expenditure) and/or while actually performing the workload 104 on a server 112 (e.g., after accepting the workload and initiating its performance on a server 112, monitoring the resource expenditure of the server 112). A combination of such techniques may be utilized, both to adjust the service unit cost 206 of individual workload units of the workload 104 (e.g., initially projecting a service unit cost 206 for the workload 104, and later notifying the client 102 that the actual service unit cost 206 is higher or lower than the estimate based on metrics of computational resource expenditure during performance of the workload 104). Alternatively, it may be desirable to commit to a service unit cost 206 of a particular workload 104, even if the number of service units 202 of computational resource expended by a server 112 in completing the workload 104 differs. In some scenarios, the availability of a guarantee of the service unit cost 206 may be contingent upon the determinability and/or confidence of the operations of the workload 104; e.g., some workloads 104 may be provably completed within a maximum number of service units 202 of computational resources, while other workloads 104 may be conditional and/or present a range of best-case and worst-case scenarios that are likely to occur with indeterminate frequency.

As still another alternative, the service unit cost 206 of the workload 104 may be specified only indirectly. For example, a client 102 may agree to a service unit rate, such as ten service units 202 per minute. The actual completion of the workload 104 within that time frame may vary based on the actual service unit cost of the workload units. If the service unit costs 206 of a workload unit of the workload 104 is later determined to be two service units 202 per workload unit, the selected service unit rate may be five workload units per minute; and if the service unit costs 206 of a workload unit of the workload 104 is determined to be ten service units 202 per workload unit, the selected service unit rate may be one workload unit per minute. Such flexibility may permit the client 102, and the identification and reporting of the service unit costs 206 to the client 102, may enable the client 102 to tailor the computational complexity of the workload 104 as a tradeoff for the rate of completed workload units of the workload 104. Alternatively, the client 102 may choose to expand and/or reduce the workload unit rate to accommodate the actual service unit costs 206 of the workload 104. Many such scenarios may be devised to identify the service unit costs 206 of the workload 104 to be executed by the server set 108 in accordance with the techniques presented herein.

E3. Measuring Service Unit Rate Capacities of Servers

A third aspect that may vary among embodiments of the presented techniques involves the measurement of the service unit rate capacity 210 of the respective servers 112 of the server set 108. The estimation of the service unit rate capacity that a server 112 of the server set 108 is capable of providing may correlate with the number and variety of workloads 104 to be allocated to the server 112, which may promote both performance (e.g., the capability of the server 112 to execute the assigned workloads 104 in a manner that fulfills guarantees along various performance dimensions 122, as may be specified in a service level agreement 118) and efficiency (e.g., reasonably full utilization of the server 112 and the reduction of idle resources beyond safeguards).

As a first variation of this third aspect, the determination of service unit rate capacities 210 may be performed heuristically, e.g., based on an estimation model that maps server architectures to probable service unit capacities 210. Such estimation may include a variety of hardware factors, such as: the number and nature of processors, including details such as core counts, multiprocessing capabilities, supported feature and instruction sets, and cache sizes and types; the size and type of memory available to the processor; the width and performance characteristics of a bus interconnecting the memory and processors; the type, sizes, and available capacity of storage; the number and performance characteristics of communication interfaces, such as network adapters; and the availability of specialized hardware devices, such as graphics processors. Such estimation may also include a variety of software factors, such as: the nature and maintenance status of operating system, and the type and sophistication of services libraries, and runtime platforms, such as process and thread schedulers, virtual machines, and hypervisors. Such estimation may also include a variety of inter-device factors, such as server-to-server communication pathways; a network and/or multiprocessing architecture; and the availability of replicas to provide backup and/or supplemental resources in the event of a component failure or to provide scalability to meet increased demand. These and other factors may inform the heuristic assessment of a server 112, both individually and as a member of a subset of the server set 108, and the prediction of service unit rate capacity 210 attributed thereto.

As a second variation of this third aspect, the determination of service unit rate capacities 210 may be performed on a comparative basis in view of previously established service unit rate capacities 210 of other servers 112. For example, a new server 112 may be compared with a set of other servers 112 that have previously been assessed, and the service unit rate capacity 210 of the new server 112 may be determined via correlation with the service unit rate capacities 210 of the other servers 112 taking into account component similarities and differences. Clustering techniques may be utilized in this context; e.g., the server set 108 may be collectively evaluated to identify relatively consistent service unit rate capacities 210 for subsets of servers 112 with similarities of key components that are determinative of performance, while discounting factors that may be less predictive, such as device manufacturer and the presence or absence of user input devices.

As a third variation of this third aspect, the determination of service unit rate capacities 210 may be achieved via simulation. For instance, a workload unit of a standardized workload type may be formulated and executed by a server 112, and the throughput of the server while performing the standardized workload unit (e.g., the duration of processing the workload unit and/or the number of workload units that the server 112 is capable of performing consecutively) may inform the determination of the service unit rate capacity 210 of the server 112. The simulation may be performed in a standardized environment, such as within a virtual machine that provides a common environment in which the workload unit is executed to generate comparative data. Alternatively or additionally, the simulation may occur within a native environment of the server 112, optionally using or excluding various resources that the server 112 may utilize for the processing, which may provide a more device-specific assessment of achievable service unit rate capacity 210. As a first such example, several standardized workload units may be executed concurrently, e.g., to assess the scalability of the capabilities of the server 112 in response to varying load. As a second such example, the standardized workload units may be selected of particular workload types (e.g., simple database querying tasks, transactions that involve resource reservations, and bus-intensive operations such as streaming data) to assess various performance characteristics of the server 112 that may contribute to and/or limit the service unit rate capacity 210 of the server 112. In some instances, a plurality of servers 112 may be tested together to identify the service unit rate capacities 210 of the interoperating servers 112, such as the collective performance of a group of servers 112 in processing a distributed transaction using a particular communication media such as a local-area network or the internet. A range of simulations may also be performed to identify a service unit rate capacity profile that the server 112 may exhibit under a variety of conditions.

As a fourth variation of this third aspect, the determination of the service unit rate capacity 210 of a server 112 may occur on a trial basis, e.g., by processing a selected workload unit of an actual workload 104 that may be processed by the server 112, and for which a service unit cost 206 has been established. The workload unit may be selected from the workload 104 in various ways. As a first example, a workload unit may be selected as a typical workload unit, wherein the resulting service unit rate capacity 210 may reveal the service unit rate capacity 210 of the server 112 under typical workload units of the workload 104. As a second example, the workload unit may be selected as a worst-case workload unit, wherein the resulting service unit rate capacity 210 may reveal a boundary of the lowest service unit rate capacity 210 that the server 112 is likely to exhibit for workload units presenting the highest utilization of computational resources. A range of workload units may also be tested to identify a service unit rate capacity profile that the server 112 may exhibit under a variety of conditions for the workload 104 of interest.

As a fifth variation of this third aspect, the determination of the service unit rate capacity 210 of a server 112 may be determined via monitoring of the actual execution of one or more workloads 104. For example, an initial assessment of the service unit rate capacity 210 of a server 112 may be established (e.g., determining that the server 112 is estimated as capable of processing 400 service units per hour), and an initial server load of workloads 104 may be assigned to the server 112. As the server 112 processes these workloads 104, a monitoring process, either provided onboard the server 112 or via another device in communication with the server 112, may monitor the rate of completion of workload units of various service unit costs 206, and may determine the actual service unit rate capacity 210 that the server 112 is exhibiting or has exhibited under different conditions. The monitoring may be performed concurrently or retrospectively based on logged data. If the monitoring reveals that the initial service unit rate capacity 210 of the server 112 was generally accurate, the confidence in the determination of the service unit rate capacity 210 of the server 112 may be increased, and the results may be used to establish or correct the service unit rate capacities 210 of other, similar servers 112. If the monitoring reveals that the initial service unit rate capacity 210 of the server 112 was inaccurate or incomplete, the allocation of workloads 104 to the server 112 and/or other servers 112 of the server set 108 may be redistributed to reflect the achievable service unit rate capacities 210 in the interest of maintaining both efficiency (e.g., promoting full utilization of computational resources) and reliability (e.g., refraining from overloading a server 112 in a manner that risks diminished performance, which may result in a failure of a guarantee provided in a service level agreement 116).

As a sixth variation of this third aspect, a set of service unit rate capacities 210 may be identified for the server 112 may be established for varying conditions. That is, the use of a service unit 202 as a standardization mechanism for assessing workloads and computational capacity may be balanced against the possibility of overgeneralization for workloads of different types, which may cause load-balancing techniques to assign resources based on inaccurate or incomplete models that leads to idle resources and/or overloading. As a first such example, a server 112 may be evaluated as exhibiting a first service unit rate capacity 210 for performing workloads 104 that are generally limited by processing capacity (e.g., encryption or statistical evaluation) and a second service unit rate capacity 210 for workloads 104 that are generally limited by communication bandwidth (e.g., pattern detection in large volumes of data). As a second such example, a first server 112 may exhibit a high service unit rate capacity 210 while processing workloads 104 that involve significant throughput performance dimension 112, and a lower service unit rate capacity 210 while processing workloads that are constrained by a latency performance dimension 122. In some cases, a server 112 may be exhibit a consistent service unit rate capacity 210 when loaded with either type of workload 104 or a combination thereof; in other cases, a server 112 may exhibit different service unit rate capacities 210 for the different workloads. It may therefore be advantageous to establish different service unit rate capacities 210 for different workload types, and to use the workload-type-specific service unit rate capacities 210 of the server 112 during load-balancing (e.g., preferentially assigning workloads 104 to the server 112 that maximize its service unit rate capacity 210 and that preferentially avoid loading the server 112 with workloads 104 of workload types for which the server 112 exhibits diminished service unit rate capacity 210). In this context, it may be advantageous to measure the service unit rate capacity 210 of the server 112 in a variety of contexts, such as a high computational load vs. typical computational load, and/or while processing workloads 104 with particular types of performance dimensions 122. The evaluation of the server 112 under a range of workloads 104 may therefore promote a more complete model of the service unit rate capacity 210 and that leads to more accurate load-balancing of the server 112 among the server set 108. Many such techniques may be utilized to evaluate the service unit rate capacity 210 of a server 112 in accordance with the techniques presented herein.

E4. Formulation of Service Level Agreements

A fourth aspect that may vary among embodiments of the presented techniques involves the formulation of service level agreements 116 that describe the manner in which the server set 108 will process the workload 104, potentially including guarantees of various performance dimensions 122 such as latency, concurrency, availability, and/or scalability.

As a first variation of this fourth aspect, a client 102 may be permitted to submit or describe a workload 104 to determine the service unit cost 206 of workload units of the workload 104 as part of the service level agreement 116. That is, a client 102 may have a particular application or task in mind, and/or may have formulated a subset of the workload 104 that may be used for testing or evaluation as a forecast of the performance of the server set 108 for the workload 104 as a whole. Alternatively, a client 102 may provide a description of the workload 104, such as a type of statistical evaluation to be performed over a particular type and volume of data. A service for accepting workloads 104 into the server set 108 may analyze the workload 104 or the description thereof to identify the service unit cost 206 of performing workload units of the workload 104. This determination may enable the client 102 to understand the rate of completion of workload units if processed at a selected service unit rate 208. For example, if the workload 104 is evaluated at ten service units per workload unit, the client 102 may understand that requesting execution of the workload 104 at a selected service unit rate 208 of 100 service units per minute may enable the completion of ten workload units per minute. This information may enable the client 102 to determine how the performance of the server set 108 is likely to change as the service unit cost 206 of the workload 104 changes (e.g., the degree to which adding features or complexity that increasing the service unit cost 206 reduces the rate of completion, and/or the degree to which removing features or optimizing the workload 104 is likely to reduce the service unit cost 206 per workload unit and increase the rate of workload unit completion). Alternatively or additionally, this information may enable the client 102 to determine a selected service unit rate 208 of the server set 108 that is likely to be necessary to provide a selected rate of completion of workload units, e.g., a volume of requests that the service is capable of handling per unit of time.

As a second variation of this fourth aspect, a client 102 may submit a workload 104, and the service may offer a range of service level agreements 116 that may be applied to the workload 104. For example, the service may evaluate the types of operations involved in the workload 104, the performance dimensions 122 of the workload 104 (e.g., an indication that a particular task is to be completed within a certain latency boundary, or with a certain redundancy), and/or the computational capacity of the server set 108, and may formulate a service level agreement 116 that is suitable therefor. In one such embodiment, the evaluation and/or monitoring of a first workload 104 may inform the formulation of a service level agreement 116 for a second, subsequently presented workload 104; e.g., if a workload is determined to be successfully guaranteed within a selected service level agreement 116, a similar service level agreement 116 may be presented as an option for future requests to service similar workloads 104. In one such embodiment, a service level agreement 116 may guarantee a completion of a task within a set latency (e.g., the completion of indexed writes within 15 milliseconds and the completion of reads within 10 milliseconds) and 99.99% high availability. Such guarantees may be provided unconditionally and/or conditioned upon certain limitations (e.g., a guarantee of reads within 10 milliseconds and a completion of indexed writes within 15 milliseconds for at least 99% of such operations).

In some variations, the service may offer to the client 102 a range of service level agreements 116 with various options among various performance dimensions 122. As a first such example, a service may offer service level agreements 116 that respectively provide a latency option within a range of latencies for various tasks. As a second such example, a service may offer service level agreements 116 that respectively provide an availability option within a range of availabilities for the workload, such as an uptime percentage. As a third such example, a service may offer service level agreements 116 that respectively provide a throughput option within a range of throughputs for the workload, such as a guaranteed ability to complete 10 service units of the task per minute. As a fourth such example, a service may offer service level agreements 116 with that respectively provide a consistency level guarantee, such as a selection from a consistency level set comprising: a strong consistency level, a bounded staleness consistency level, a session consistency level, a prefix consistency level, and an eventual consistency level.

As a third variation of this fourth aspect, a service may offer service level agreements 116 that respectively provide a scalability option within a range of scalabilities for the workload 104 for any of several performance dimensions 122 such as throughput, latency, availability, and/or concurrency. For example, the service level agreement 116 may involve a guarantee that the service is capable of expanding from a current throughput to a higher throughput (e.g., from ten service units per unit of time to twenty service units per unit of time). Such scalability may be offered in the service level agreement 116 in response to a request of the client 102 (e.g., the higher throughput is guaranteed to be provisioned and available for the workload 104 within a selected time frame of the client's request) and/or in response to certain performance thresholds (e.g., the higher throughput is guaranteed to be provisioned and available for the workload 104 within a selected time frame of a triggering condition, such as a surge of demand or influx of requests for the workload, or if the complexity of the workload 104 causes the service unit cost to scale upward to a point that constrains throughput at the selected service unit rate). Such scalability guarantees may also involve guarantees to reduce the throughput (e.g., in order to reduce the selected service unit rate that is being provided for a workload 104). Such scalability may also be guaranteed within a selected time frame. In an embodiment, scalability requests may be guaranteed to be fulfilled for a workload 104 within five seconds of receiving the request. Such scalability guarantees may be premised, e.g., upon the current and projected availability of computational resources to provide the increased performance guarantee (e.g., the allocation of additional servers 112 and/or replicas to expand the range of servers 112 that is actively processing a workload 104 in order to reduce latency and/or increase throughput). Such scalability guarantees may be fulfilled, e.g., by maintaining a reserved set of servers 112 and/or replicas that may be deployed in a short time frame to fulfill a scaling request. Alternatively, scalability guarantees may be based on upon the current and/or projected alternative demand for servers 112 and/or replicas to be reallocated to other workloads 104 in the event of a request to reduce one or more performance dimensions 122, such that deallocated servers 112 may be rapidly be deployed to other productive uses.

As a fourth variation of this fourth aspect, different service level agreements 116 may be formulated for different tasks and/or workloads 104 for the same client 102. For example, a workload 104 comprising a particular application may involve three distinct tasks, which may have different significance, performance constraints, and/or relevance to the client 102 (e.g., a first task of the workload 104 may comprise a transaction with tight constraints on latency and/or concurrency, such as a product order, while a second task of the workload 104 may comprise relaxed constraints on latency and/or concurrency, such as a product browsing request). A service level agreement 116 may be formulated that specifies different guarantees along different performance dimensions 122 for different portions of the workload 104. Some guarantees may be discrete and specific to each task (e.g., a guaranteed selected service unit rate of twenty service units per minute for a first task and another twenty service units per minute for a second task); alternatively or additionally, some guarantees may be shared among tasks (e.g., a guaranteed selected service unit rate of twenty service units per minute that is to be shared by two or more tasks). As another example, service level agreements 116 may be formulated for and in view of the details of the respective tasks. Alternatively, a stock set of service level agreements 116 may be offered for any task (contingent upon the identification and selection of the service unit rate the task to fulfill a selected service level agreement).

As a fifth variation of this fourth aspect, different service level agreements 116 may be applicable in different circumstances. As a first such example, the service level agreement 116 may and guarantee a first set of performance dimensions 122 during a first time range (e.g., during peak or prime hours of the day) and a second set of performance dimensions 122 during a second, distinct time range (e.g., during off-hours of the day). As a second such example, the service level agreement 116 may specify and guarantee a first set of performance dimensions 122 for portions of the workload 104 arising within a first region (e.g., a region that is close to a cluster of servers 112, such that low latency, high throughput, and/or plentiful scalability can be guaranteed) and a second set of performance dimensions 122 for portions of the workload 104 arising within a second region (e.g., a region that is distant from all clusters of servers 112, such that low latency, high throughput, and/or scalability are more difficult or speculative to guarantee). As a third such example, the service level agreement 116 may specify and guarantee a first set of performance dimensions 122 for portions of the workload 104 performed for a first client 102 or user (e.g., low-latency guarantees write requests received from journalists who submit breaking-news stories to a news service) and a second set of performance dimensions 122 for other clients 102 and/or users (e.g., more relaxed low-latency guarantees for write requests received from editorialists who submit casual remarks about other news stories).

As a sixth variation of this fourth aspect, the service level agreements 116 may offer a range of options for a set of different performance dimensions 122. For example, a service level agreement 116 may specify a performance dimension set of performance dimensions 122 for performing the workload 104 that include an availability dimension, a latency dimension, a consistency dimension, and a throughput dimension. Each offered with a selected performance guarantee and each affecting the service unit cost 206 to complete a workload unit of the workload 104, such that the service unit cost 206 is based at least in part on the performance dimension set of the service level agreement 116. In some such embodiments, the respective performance dimensions 122 may be distinct and unrelated; e.g., a first set of options for latency guarantees may be provided, and a second set of options for availability guarantees may be provided. The selection of an option for each performance dimension 122 may affect the total service unit cost of performing a workload unit of the workload 104, but may otherwise not be particularly related. In other such embodiments, the selection of a first option for a first performance dimension 122 may be related to, contingent upon, and/or mutually exclusive with the selection of a second performance dimension 122. For example, the set of available service level agreements 116 may include a first set of options for consistency levels, such as strong consistency guarantee and eventual consistency guarantee, and a second set of options for latency, including a low-latency guarantee and a modest-latency guarantee. However, the option for a strong consistency guarantee may be mutually exclusive with the option for a low-latency guarantee, as the configuration of the servers 112 to fulfill the strong consistency guarantee may not be compatible with the configuration of the servers 112 to fulfill the low-latency guarantee. Put another way, the selection of the strong concurrency guarantee option may be contingent upon the concurrent selection of the modest-latency guarantee option, and the selection of the low-latency guarantee option may be contingent upon the concurrent selection of the eventual consistency guarantee. Other embodiments may permit the concurrent selection of both a strong consistency guarantee option and a low-latency guarantee option, although the concurrent selection of both options may involve the reservation of a significantly larger number of computational resources to fulfill both guarantees, which may increase the service unit cost 206 of the workload 104 to a disproportionately higher value than only selecting either option.

Figure 7:
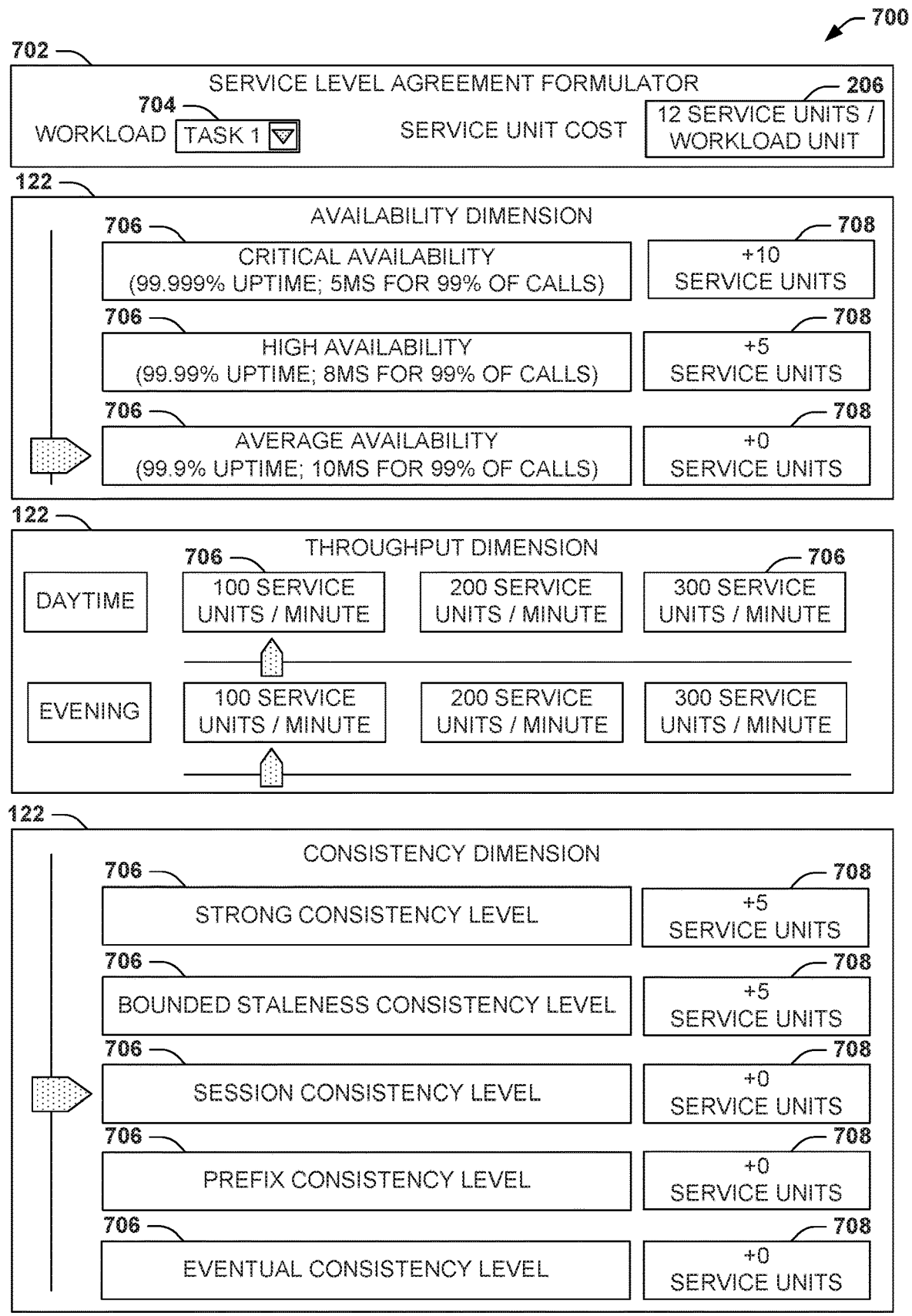
FIG. 7 is an illustration of an example scenario featuring a service level agreement for a service in accordance with the techniques presented herein.

FIG. 7 is an illustration of an example featuring one such embodiment, the service may offer to the client 102 a set of selectable service level agreements 116 that may enable a client 102 to identify the type of service to be provided for a workload 104. This example scenario 700 presents a service level agreement formulator 702 that permits a client to select options for the various performance dimensions 122 of the workload 104 from a set of options. Additionally, in this example scenario 700, the workload 104 comprises a set of workload tasks, and the service level agreement formulator 702 permits the client 102 to select a different combination of performance dimensions for each workload task 704 of the workload 104.

As a first such example, the service level agreement formulator 702 includes options for an availability dimension 122, with selectable availability dimension options 706 including a critical availability option, such as may be applicable for essential or high-priority workload tasks 704; a high availability option, such as may be applicable for significant or medium-priority workload tasks 704; and an average availability option, such as may be applicable for casual or low-priority workload tasks 704. Each option 706 for the availability dimension 122 may be specified in various ways, such as a guarantee of percent uptime and/or a guarantee of latency for various calls. Moreover, the respective options 706 may be associated with a differential service unit cost 708, where more stringent availability and/or latency guarantees involve the reservation of a greater share of computational resources, and therefore increase the service unit cost 206 for each workload unit of the workload task 704. In some scenarios, the differential service unit costs 708 of the respective options 706 may be specific to a workload task 704; e.g., a 10-millisecond latency guarantee may involve a lower differential service unit cost 708 for a first workload task 704 that is to be provided in a nearby region that is very close to the servers 112 that are committed for the workload task 704 than for a second workload task 704 that is to be provided in a distant region that is far from the servers 112 that are committed for the workload task 704, since a greater number of servers 112 may have to be allocated in the latter case to fulfill the latency guarantee.

As a second such example, the service level agreement formulator 702 includes options for a consistency dimension 122, which may be identified in terms of the type of consistency level that is guaranteed for workload units of the workload 104 (e.g., the consistency level or consistency model that respective workload units of the workload 104 are guaranteed to fulfill). For example, the consistency level options 706 may include a strong consistency level option 706, wherein incoming workload units across the workload 104 are consistency applied in a strict "wall-clock" order; a bounded staleness consistency level option 706, which may define a duration bound between the intake of a workload unit of the workload 104 and the commitment and availability of the completed workload unit is achieved across the entire server set 108; a session consistency level option 706, which may indicate that the ordering of workload units within a session remains coherent, even if the ordering of workload units within different sessions may diverge; a prefix consistency level option 706, which may indicate that the workload units up to a certain prefix or checkpoint boundary are guaranteed to exhibit a coherent ordering; and/or an eventual consistency level option 706, in which the consistency of applied workload units is eventually achieved across the entire server set 108, though with no defined boundary between older, consistent workload units and newer, potentially inconsistent workload units. Moreover, differential service unit costs 708 may be applied to the service unit cost 206 of the workload task 704 in response to the selection of increasingly stringent consistency levels options 706, and therefore increase the service unit cost 206 for each workload unit of the workload task 704.

As a third such example, the service level agreement formulator 702 includes options for a throughput dimension 122, which may be identified in terms of service unit rates 208. For example, the throughput dimension may provide distinct options for 100 service units per minute, 200 service units per minute, and 300 service units per minute. In this example, the service level agreement formulator 702 may permit the client 102 to select different throughput dimensions 122 for daytime periods and evening periods, e.g., according to the time zone of a geographic region in which the workload 104 is to be performed and/or provided. In some embodiments, the client 102 may be permitted to select different units of time, such as service units per minute and service units per hour; a shorter unit of time may provide a finer-granularity and more consistent throughput guarantee, while a longer unit of time may provide a coarser-granularity throughput guarantee that is more capable of flexing to accommodate surges in workload demand.

In this example scenario 700, the resulting throughput is contingent upon the quotient of the service unit rate 208 and the service unit cost 206 of the task 704. For example, the workload 104 may comprise a first task 704 (with a first selected availability dimension option 706 and a first selected consistency level option 706) that presents a service unit cost 206 of 10 service units per workload unit, and a first second 704 (with a second, higher selected availability dimension option 706 and a second, higher selected consistency level option 706) that presents a service unit cost 206 of 20 service units per workload units per minute. A selection of 100 service units per minute for each workload task 704 may result in a throughput of 10 workload units per minute for the first workload task 704 and a throughput of 5 workload units per minute for the second workload task 704. In this manner, dissimilar workloads 104 and workload tasks 704 that are governed by different service level agreements 104 may be load-balanced over a server set 108 in a manner that accurately and precisely reflects the computational resources involved in fulfilling the performance guarantees relevant to each workload 104 and workload task 704, and in a manner that balances accurate load-balancing to reduce both underprovisioning (e.g., underestimating the computational resources involved in fulfilling the performance guarantees for a workload 104, which may increase volatility and/or cause a performance guarantee to fail) and overprovisioning (e.g., underestimating the computational resources involved in fulfilling the performance guarantees for a workload 104, which may result in idle computational resources) in accordance with the techniques presented herein.

As a seventh variation of this fourth aspect, the range of available service level agreements 116 may change over time, e.g., in response to changes in the collection of computational resources comprising the server set 108. As a first such example, if server resources are added to the server set 108 and/or are released from previous provisioning, additional service level agreements 116 may be provided with new performance options 706, such as a new capability to provide a higher tier of availability or throughput. As a second such example, if server resources become limited (e.g., due to the failure of a server 112 or server set 108 that reduces the availability of spare resources), the range of service level agreements 116 may be curtailed to reduce the incidence of overcommitting to provide new performance guarantees for which the available computational resources may not be adequate. As a third such example, the service unit cost 206 of the workload task 704 may change over time (e.g., due to more accurate estimates of the computational load imposed by each workload unit of the workload task 704, and/or due to changes in the workload task 704, such as the addition or removal of features or the optimization of logical processes by the client 102). The service level agreements 116 that are available for the workload task 704 may reflect these changes, e.g., by providing new options for various performance dimensions and/or updates to the particular details of the performance guarantees. Many such variations may arise during the formulation of service level agreements 116 in accordance with the techniques presented herein.

E5. Configuration of Server Set for Service Level Agreement

A fifth aspect that may vary among embodiments of the presented techniques involves the configuration of the server set 108 to fulfill the service level agreements 116 of a workload 104 or workload task 704. Such configuration may include the addition, reservation, provisioning, and/or transfer of computational resources, such as servers 116, server clusters, and/or replicas, as well as other types of computational resources, such as nonvolatile storage and/or network bandwidth, in order to fulfill the collection of performance guarantees of the service level agreements 116 of the workloads 104. In accordance with the techniques presented herein, the use of service units 202 as a metric or unit of exchange to indicate the computational resources involved in completing each workload unit of each workload 104, and for the measurement of the service unit rate capacity 210 of the respective servers 112 over which such workloads 104 may be allocated, may provide a more accurate configuration and load-balancing technique than other techniques, such as that shown in the example scenario 100 of FIG. 1.

As a first variation of this sixth aspect, the selection of a service level agreement 116 involving an availability dimension may lead to the reservation of a selected number of servers 116 that, together, may be capable of fulfilling all workload units of the workload 104 in accordance with the selected availability dimension. For example, a 99.9% availability guarantee may involve the reservation of a selected number of servers 116 for the workload 104, and a 99.99% availability guarantee may involve the reservation of a large number of servers 116 for the workload 104. Such reservation may include, e.g., both the number of servers 116 that present an aggregate statistical likelihood of fulfilling the availability guarantee, as well as the reservation of one or more additional servers 116 as failover in the event that one of the other reserved servers 116 fails.

As a first example of this first variation of this sixth aspect, respective servers 116 of the server set 108 may be located within a fault domain, wherein the fault domain indicates the servers 116 of the server set 108 that are likely to fail together (e.g., a cluster of servers 116 in a rack, building, city, or region, where an outage such as a fire or a network partition is likely to cause all servers 116 within the fault domain to fail together). Identifying the server subset of servers 112 to perform the workload 104 in a manner that fulfills the availability dimension may involve selecting the server subset that spans a plurality of fault domains. For instance, if the server subset spans five fault domains, such as five different buildings or regions, the failure of a single fault domain may nevertheless enable the workload 104 to be performed by the servers 112 of the other four fault domains in a manner that fulfills the availability guarantee.

As a second example of this first variation of this sixth aspect, respective servers 112 of the server subset may further comprise a logical endpoint for the portion of the workload 104 that is assigned to the server 112. For example, among the server subset, a particular server 112 may be referenced by a logical path that ends in a logical endpoint identifying the server 112. In order to promote compliance with an availability guarantee, responsive to detecting a failure of a selected server 112, the server set 108 may transfer the portion of the workload 104 to a failover server 112 and reassign the logical endpoint for the portion of the workload 104 to the failover server 112. The failover server 112 may be held in reserve for the workload 104 in the event of a failure, and/or may be a member of a set of reserved servers 112 that are generally available to substitute for any server 112 of the server set 108 and for any workload 104 allocated thereto, where such substitution involves remapping the logical endpoint from the failed server 112 to the failover server 112. In some scenarios, the selection of a failover server 112 may be performed in many ways; e.g., if the server 112 exhibiting the failure is part of a first fault domain, a failover server 112 may be selected and remapped as the logical endpoint that is in a second, different fault domain as the failed server 112. Such failover techniques may also be applied at the level of replicas, and/or at the level of portions of a server 112; e.g., a first server 112 may reserve 25% of its service unit rate capacity 210 to serve as a failover replica in order to accept a workload 104 with a service unit rate 212 that was allocated to a second server 112 that has failed. The first server 112 in this example may comprise a failover server 112 that is held in reserve, and for which portions of the failover server 112, as portions of the total service unit rate capacity 210, may be allocated to address one or more failures of other servers 112; alternatively, the first server 112 may be allocated as part of a server subset for a first workload 104, and part of its service unit rate capacity 210 may be held in reserve for remapping as the logical endpoint in place of the second server 112. It is to be appreciated that the use of service units 202 in this endeavor, as both a metric of the computational load of the workload 104 for which the logical endpoint is to be remapped and as a metric of the available service unit rate capacity 210 of the first server 112 to provide adequate computational resources to serve as the failover server 112, may provide a more accurate failover technique in accordance with the techniques presented herein.

As a second variation of this sixth aspect, the selection of a service level agreement 116 involving a latency dimension may lead to a reservation of a selected number of servers 112, including portions of servers 112 such as replicas. As a first such example, the nature of the workload 104 and the type of latency may influence the selection of servers 112. As a first such example, a low-latency read guarantee involve reserving a larger number of servers 112, such that even at peak volume for the workload 104, a server 112 of the server subset has a sufficient reservation of service unit rate capacity 210 to handle an incoming read request within the latency guarantee. Conversely, and as a second such example, a low-latency write guarantee (particularly when coupled with a stringent consistency level guarantee) may involve reserving a smaller number of servers 112, such that a write request may be guaranteed to be committed to the entire collection of servers 112 within the latency guarantee. As a second such example, the selection of the server subset to fulfill a latency guarantee may involve preferentially selecting servers 112 that are geographically close to the locations of the workload 104. For example, if the workload 104 comprises write requests that are anticipated to originate from a particular geographic region, servers 112 may be selected for the workload 104 that are physically proximate to the geographic region in order to minimize network transport delays.

As a third variation of this sixth aspect, the selection of a service level agreement 116 involving a throughput dimension may lead to a reservation of a selected number of servers 112, including portions of servers 112 such as replicas, that are capable of handling the throughput. As a first such example, a client 102 may specify a maximum service unit rate 206 to be available for the workload 104 at all times, and servers 112 may be allocated that together present an aggregate service unit rate capacity 210 that is capable of handling the throughput at the service unit cost 206 of the respective workload units of the workload 104 at peak volume. As a second such example, the service level agreement 116 for a workload 104 may specify different throughput guarantees for different workload tasks 702; for different times of day, week, month, or year; and/or for different geographic regions. From the server set 108, a server subset of servers 112 may be selected where the respective throughput guarantees are individually satisfied by a selection of the subset of selected servers 112. As a second such example, the service level agreement 116 may specify a throughput guarantee as a surge rate, e.g., a higher throughput that the server set 108 is to be capable of providing in the event of a surge of the workload 104. In some such scenarios, it may not be efficient to hold computational resources in reserve specifically to await the occurrence of a surge; rather, the server set 108 may store a set of reserved resources for the entire collection of workload 104, and from which any portion may be selected and allocated for a selected workload 104 that is exhibiting a surge. For example, the server set 108 may comprise a collection of spare computational resources of one or more server 108, which are held as a set of unallocated replicas. For a workload 104 that is experiencing a surge, the throughput guarantee may be fulfilled by allocating an unallocated replica from the collection of unallocated replicas. In some such scenarios, the surge rate may be applied as soon as a surge is detected; alternatively or additionally, the surge rate may be applied prospectively in anticipation of a surge for a workload 104. As a third such example, such techniques may be applied as a scalability guarantee; e.g., the service level agreement 116 may specify that a client may initiate a request to expand the throughput of a workload 104, and that the request is to be fulfilled within a selected time frame. In one such embodiment, the reservation of unallocated replicas may enable the fulfillment of this guarantee; e.g., a request to scale up the throughput of a particular workload 104 may be guaranteed to be fulfilled within five seconds, due to a maintained availability of unallocated replicas into which the workload 104 may be rapidly expanded.

As a fourth variation of this sixth aspect, the fulfillment of service level guarantees 116 through the allocation of the server set 108 for the collection of workloads 104 may involve load measurement and balancing. As a first such example, allocating the subset of computational resources of a server 112 may further involve partitioning the computational resources of the server 112 into a set of replicas. When a workload 104 is to be deployed and/or expanded in the server set 108, a replica within the server 112 for the workload 104 according to a service unit rate (e.g., as a share of its available service unit rate capacity 210). The replica may be allocated as a subset of computational resources of the server 112 that provide the service unit rate of the replica to process the workload 104. In one such example, the workload 104 may comprise a background task that is performable at a service unit rate 212, such as compressing, archiving, and/or indexing data; applying data mining techniques to extract knowledge from the data; and/or performing verification of the data, such as periodically verifying parity bits of the data to identify and correct bit error incidents. The server 112 may detect an idle period of the replica with a service unit rate spare capacity 210, and apply the computational resources to the background task of the replica at the service unit rate spare capacity 210.

As a fifth variation of this sixth aspect, the resources of servers 112 may be combined to provide the service unit rate capacity 210 for a collection of workloads 104. For example, a service may compare the allocated service unit rates 212 of a selected server 112 of the server subset with an achieved service unit rate 212 to detect a service unit rate deficiency (e.g., an inability of the server 112 to sustain the service unit rate capacity 210 at a level that is consistent with its estimated service unit rate capacity 210 and/or the performance guarantees of the service level agreements 116 of the workloads 104 allocated to the server 112). To address this deficiency, an auxiliary server 112 of the server set 108 may be identified that has a service unit rate spare capacity 210, and a portion of the workload 104 comprising the service unit rate deficiency may be transferred from the selected server 112 to the auxiliary server 112. That is, rather than indicating that the first server 112 has failed such that a failover server 112 is to be selected as a substitute for all workloads 104 allocated to the first server 112, a portion of the service unit rate capacity 210 of the auxiliary server 112 may be allocated to handle a portion of the workload 104 of the first server 112 in order to reestablish compliance with the performance guarantee of the service level agreement 116. In this manner, the resources of the servers 112 may be combined and shared, using service units 202 and service unit rates 206 as metrics of workload and server capacity, to fulfill the collection of service level agreements 116 provided for the workloads 104 to which the server set 108 is allocated. Many such techniques may be utilized to apply load-balancing techniques in the context of service units 202 in accordance with the techniques presented herein.

F. Computing Environment

Figure 8:
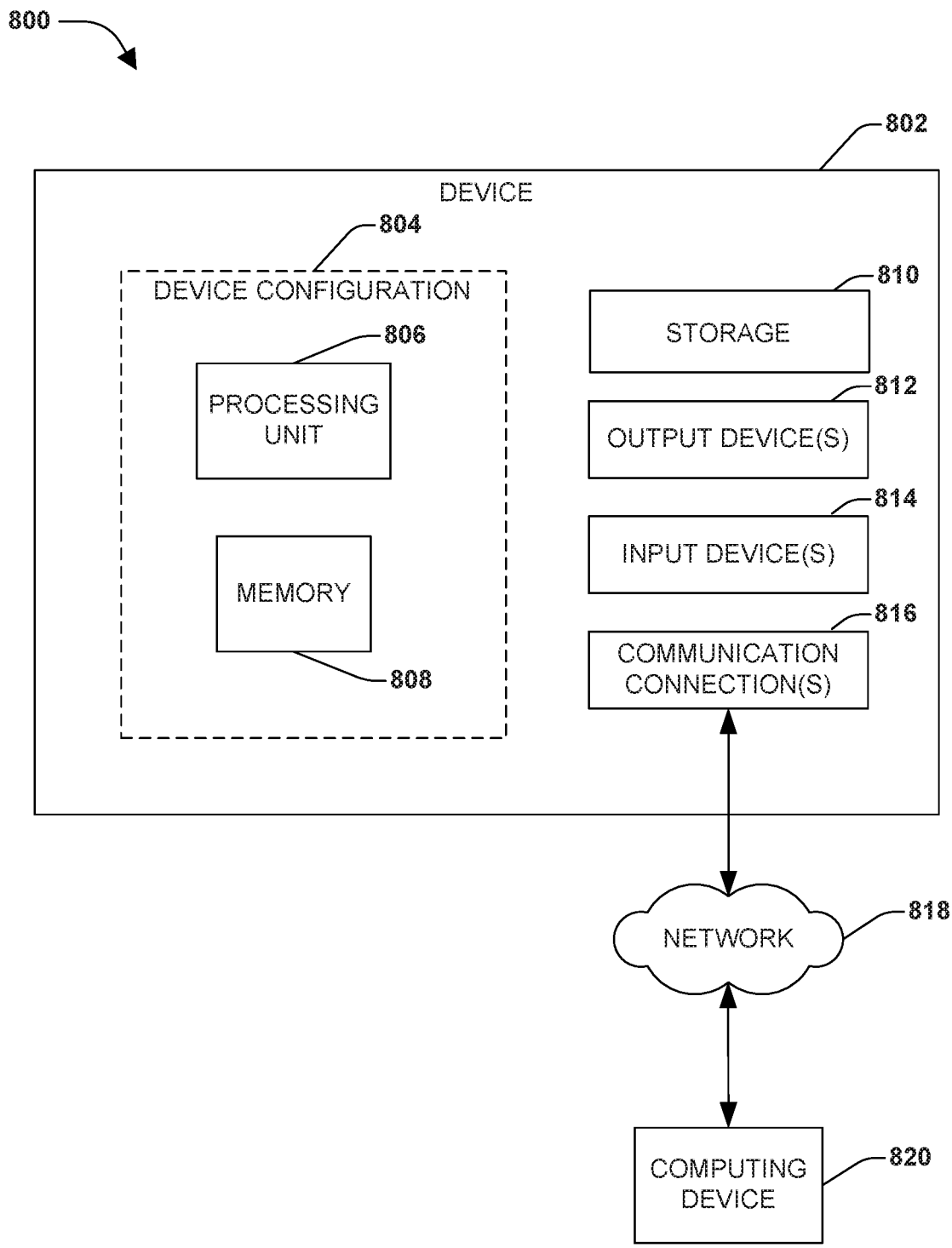
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media may be part of device 802.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A server that performs a workload as part of a server set, the server comprising:
   a processor; and
   a memory storing instructions that, when executed by the processor, cause the server to:
      identify a service unit rate capacity of the server as a rate of service units that the server is capable of providing, wherein the service unit is a volume of computational resources of the server;
      receive a workload that is associated with a service unit cost that is consumed by a workload unit of the workload;
      receive an allocation request to allocate computational resources of the server to perform a portion of the workload at a service unit rate; and
      within the service unit rate capacity of the server, allocate a subset of computational resources of the server that are capable of performing the workload at the service unit rate.

2. The server of claim 1, wherein allocating the subset of computational resources of the server further comprises:
   partitioning the computational resources of the server into a set of replicas;
   reserving a replica for the workload with a service unit rate; and
   allocating to the replica a subset of computational resources that provide the service unit rate of the replica.

3. The server of claim 2, wherein:
   executing the instructions further causes the server to allocate spare computational resources of the server as a set of unallocated replicas; and
   reserving the replica for the workload further comprises: allocating an unallocated replica for the workload.

4. The server of claim 2, wherein:
   the replica further comprises a background task that is performable at a service unit rate; and
   executing the instructions further causes the server to:
      detect an idle period of the replica with a service unit rate spare capacity; and
      apply the computational resources to the background task of the replica at the service unit rate spare capacity.

5. A method of configuring a server comprising a processor to perform a workload as part of a server set, the method comprising:
   executing, by the processor, instructions that cause the server to:
      identify a service unit rate capacity of the server as a rate of service units that the server is capable of providing, wherein the service unit is a volume of computational resources of the server;
      receive a workload that is associated with a service unit cost that is consumed by a workload unit of the workload;
      receive an allocation request to allocate computational resources of the server to perform a portion of the workload at a service unit rate; and
      within the service unit rate capacity of the server, allocate a subset of computational resources of the server that are capable of performing the portion of the workload at the service unit rate.

6. The method of claim 5, further comprising: evaluating the computational resources of the server to estimate a service unit capacity of the server that are available for allocation to the workload.

7. The method of claim 5, wherein executing the instructions further causes the server to:
   perform a measurement of a volume of computational resources of the server that are consumed while executing a test workload; and
   determine a service unit capacity of the server according to the measurement.

8. The method of claim 7, wherein:
   for a first test workload of a first workload type, the server consumes a different volume of computational resources of the server than a second test workload of a second workload type; and
   allocating the subset of computational resources to the server further comprises: adjusting the service unit rate of the workload according to the volume of computational resources consumed by the workload type of the workload.

9. A method of configuring a server set to perform a workload, the method comprising:
   identifying a service unit cost that is consumed by a workload unit of the workload, wherein the service unit cost is based on a service unit as a volume of computational resources;
   establishing a service level agreement specifying:
      the service unit cost of the workload unit of the workload, and
      a service unit rate to be provided for the workload by the server set; and
   allocating the server set to perform the workload by:
      identifying a server subset of servers to perform the workload; and
      assigning, to respective servers of the server subset, an allocated service unit rate for a portion of the workload, wherein the allocated service unit rates of the respective servers at least sum to the service unit rate specified in the service level agreement.

10. The method of claim 9, wherein:
    the workload unit further comprises a sequence of operations that are respectively associated with a service unit cost; and
    identifying the service unit cost of the workload further comprises: summing the respective service unit costs of the respective operations of the sequence comprising the workload unit.

11. The method of claim 10, wherein:
    respective operations are of an operation type that is associated with a service unit cost; and
    summing the respective service unit costs further comprises: summing the respective service unit costs of the operation types of the respective operations of the sequence.

12. The method of claim 9, wherein:
    respective operations are to be performed in a selected circumstance; and
    identifying the service unit cost of the workload further comprises: identifying the service unit costs of performing the respective operations in the respective selected circumstances.

13. The method of claim 9, wherein:
    the service level agreement further specifies a consistency level to be applied for the workload; and
    identifying the service unit cost of the workload further comprises: adjusting identifying the service unit cost of performing the workload at the consistency level specified in the service level agreement.

14. The method of claim 9, wherein:
the workload is to be performed in a workload context; and
identifying the service unit cost of the workload further comprises: identifying the service unit costs of the workload according to the workload context.

15. The method of claim 9, wherein:
the workload further comprises a query; and
identifying the service unit cost of the workload further comprises:
  while executing the query on a selected server, performing a measurement of a volume of computational resources of the server that are consumed by the query; and
  identifying the service unit cost according to the measurement.

16. The method of claim 9, wherein:
the service level agreement further specifies a performance dimension set of performance dimensions for performing the workload, the performance dimension set comprising:
  an availability dimension;
  a latency dimension;
  a consistency dimension; and
  a throughput dimension; and
identifying the service unit cost of the workload further comprises: identifying the service unit cost based at least in part on the performance dimension set of the service level agreement.

17. The method of claim 16, wherein:
respective servers of the server set are located within a fault domain, wherein the fault domain indicates the servers of the server set that are likely to fail together; and
identifying the server subset of servers to perform the workload further comprises: in accordance with the availability dimension of the service level agreement, selecting the server subset that spans a plurality of fault domains.

18. The method of claim 16, wherein:
respective servers of the server subset further comprise a logical endpoint for the portion of the workload assigned to the server; and
the method further comprises: responsive to detecting a failure of a selected server:
  transfer the portion of the workload to a failover server; and
  reassign the logical endpoint for the portion of the workload to the failover server.

19. The method of claim 9, further comprising:
comparing the allocated service unit rate of a selected server of the server subset with an achieved service unit rate to detect a service unit rate deficiency;
identify an auxiliary server of the server set that has a service unit rate spare capacity; and
transfer a portion of the workload at the service unit rate deficiency from the selected server to the auxiliary server.

20. The method of claim 16, wherein:
the consistency dimension is selected from a consistency level set comprising:
  a strong consistency level,
  a bounded staleness consistency level,
  a session consistency level,
  a prefix consistency level, and
  an eventual consistency level; and
identifying the service unit cost of the workload further comprises:
  identifying the service unit cost based at least in part on the consistency dimension of the workload specified in the service level agreement.

* * * * *